(12) United States Patent
Ying et al.

(10) Patent No.: US 11,101,740 B2
(45) Date of Patent: Aug. 24, 2021

(54) MODULAR POWER SUPPLY SYSTEM

(71) Applicant: Delta Electronics (Shanghai) CO., LTD, Shanghai (CN)

(72) Inventors: Jianping Ying, Shanghai (CN); Ming Wang, Shanghai (CN); Xiaobo Huang, Shanghai (CN); Jun Liu, Shanghai (CN); Zhiming Hu, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 0 days.

(21) Appl. No.: 16/464,733

(22) PCT Filed: Dec. 15, 2017

(86) PCT No.: PCT/CN2017/116354
§ 371 (c)(1),
(2) Date: May 29, 2019

(87) PCT Pub. No.: WO2018/108143
PCT Pub. Date: Jun. 21, 2018

(65) Prior Publication Data
US 2019/0386560 A1    Dec. 19, 2019

(30) Foreign Application Priority Data

Dec. 16, 2016 (CN) .......................... 201611170857.3
Dec. 21, 2016 (CN) .......................... 201611191912.7
(Continued)

(51) Int. Cl.
*H02M 7/483* (2007.01)
*H02M 7/49* (2007.01)

(52) U.S. Cl.
CPC ............. *H02M 7/483* (2013.01); *H02M 7/49* (2013.01); *H02M 7/4835* (2021.05)

(58) Field of Classification Search
CPC .................. H02M 7/483; H02M 7/49; H02M 2007/4835; H02M 2001/0006;
(Continued)

(56) References Cited

U.S. PATENT DOCUMENTS 7,705,705 B2    4/2010   Zeng et al.
8,686,746 B2    4/2014   Zhou et al.
(Continued)

FOREIGN PATENT DOCUMENTS

CN    101719727 A    6/2010
CN    101795072 A    8/2010
(Continued)

OTHER PUBLICATIONS

The Non-final OA dated Mar. 9, 2018 by the USPTO.
(Continued)

*Primary Examiner* — Daniel Cavallari
(74) *Attorney, Agent, or Firm* — Qinghong Xu

(57) ABSTRACT

A modular power supply system includes: a main controller, configured to output a main control signal; N local controllers, wherein each of the local controllers is configured to receive the main control signal to output at least one local control signal; and N power units, in one-to-one correspondence with the N local controllers, wherein each of the power units includes a first end and a second end, and the second end of each of the power units is connected to the first end of an adjacent one of the power units, each of the power units is configured to include M power converters, wherein each of the power converters includes a third end and a fourth end, the fourth end of each of the power converters is connected to the third end of an adjacent one of the power converters.

15 Claims, 26 Drawing Sheets

(30) Foreign Application Priority Data

Feb. 27, 2017 (CN) .................. 201710106946.X
Dec. 12, 2017 (CN) .................. 201711322795.8

(58) Field of Classification Search
CPC ......... H02M 1/096; H02M 2001/0067; H02M 1/08; H02M 3/00; H02M 7/00; H02M 2001/007; H02M 7/487; H02M 7/493; H02M 1/00; H02M 1/32; H02M 2001/325; G05F 1/10
See application file for complete search history.

(56) References Cited

U.S. PATENT DOCUMENTS

| | | |
|---|---|---|
| 2005/0237010 A1 | 10/2005 | Ying et al. |
| 2009/0268496 A1 | 10/2009 | Tan et al. |
| 2012/0032512 A1 | 2/2012 | Aiello et al. |
| 2013/0148390 A1 | 6/2013 | Na et al. |
| 2013/0229838 A1 | 9/2013 | Wang et al. |
| 2014/0015322 A1 | 1/2014 | Milavec |
| 2015/0180352 A1 | 6/2015 | Mester et al. |
| 2015/0340890 A1 | 11/2015 | Yao et al. |
| 2016/0072395 A1 | 3/2016 | Deboy et al. |
| 2016/0190846 A1 | 6/2016 | Eckel |
| 2016/0277071 A1 | 9/2016 | Dzung et al. |
| 2017/0029242 A1 | 2/2017 | Agirman et al. |
| 2017/0033703 A1 | 2/2017 | Kikuchi et al. |
| 2017/0187234 A1 | 6/2017 | Harada et al. |

FOREIGN PATENT DOCUMENTS

| | | | |
|---|---|---|---|
| CN | 101917126 A | 12/2010 | |
| CN | 201864877 U | 6/2011 | |
| CN | 102148579 A | 8/2011 | |
| CN | 101262178 B | 5/2012 | |
| CN | 102545675 A | 7/2012 | |
| CN | 102593859 A | 7/2012 | |
| CN | 102611345 A | 7/2012 | |
| CN | 102684543 A | 9/2012 | |
| CN | 202616988 U | 12/2012 | |
| CN | 103280952 A | 9/2013 | |
| CN | 103314517 A | 9/2013 | |
| CN | 103326393 A | 9/2013 | |
| CN | 103546024 A | 1/2014 | |
| CN | 203522498 U | 4/2014 | |
| CN | 203562783 U | 4/2014 | |
| CN | 103856091 A | 6/2014 | |
| CN | 203775065 U | 8/2014 | |
| CN | 204044223 U | 12/2014 | |
| CN | 104272589 A | 1/2015 | |
| CN | 104410101 A | 3/2015 | |
| CN | 103311932 B | 5/2015 | |
| CN | 105071403 A | 11/2015 | |
| CN | 204858577 U | 12/2015 | |
| CN | 103580050 B | 1/2016 | |
| CN | 204967648 U | 1/2016 | |
| CN | 105356770 A | 2/2016 | |
| CN | 103762596 B | 3/2016 | |
| CN | 105391313 A | 3/2016 | |
| CN | 105406705 A | 3/2016 | |
| CN | 105429476 A | 3/2016 | |
| CN | 105453405 A | 3/2016 | |
| CN | 105490285 A | 4/2016 | |
| CN | 106160463 A | 11/2016 | |
| CN | 106505896 A | 3/2017 | |
| CN | 206332626 U | 7/2017 | |
| DE | 102012213055 A1 | 1/2014 | |
| EP | 2595302 A1 * | 5/2013 | ............. H02M 7/49 |
| EP | 2595302 A1 | 5/2013 | |
| EP | 2905889 A1 | 8/2015 | |
| EP | 2945273 A1 | 11/2015 | |
| FR | 3015146 A1 | 6/2015 | |
| TW | 265484 B | 12/1995 | |
| TW | 201218604 A | 5/2012 | |
| TW | 201306470 A | 2/2013 | |
| TW | 201528666 A | 7/2015 | |
| TW | 201633691 A | 9/2016 | |
| WO | 2009027520 A2 | 3/2009 | |
| WO | 2012028640 A2 | 3/2012 | |
| WO | 2014037406 A1 | 3/2014 | |
| WO | 2018050256 A1 | 3/2018 | |

OTHER PUBLICATIONS

The CN3OA dated Aug. 25, 2020 by the CNIPA.
The CN1OA dated Aug. 27, 2019 by the CNIPA.
Yuebin Zhou et al: "A control system for large-scale modular multilevel converters",Nov. 10, 2013 (Nov. 10, 2013) , pp. 163-168 , XP032539357,[retrieved on Dec. 30, 2013].
Xiaotian Zhang et al: "Study of Multisampled Multilevel Inverters to Improve Control Performance",Nov. 1, 2012 (Nov. 1, 2012) ,pp. 4409-4416 , XP011448271.
Wu Haibo et al: "Research on energy feedback topologies using in CBB multilevel converter for PMSM drives",Dec. 11, 2013 (Dec. 11, 2013) ,pp. 1-6,XP032605658.
The EESR dated Aug. 13, 2020 by the EPO.
The First Office Action for CN application No. 201711322795.8 dated Mar. 29, 2019.
The First Office Action for CN application No. 201711322794.3 dated Mar. 29, 2019.
The First Office Action for TW application No. 106144104 dated Aug. 3, 2018.
The First Office Action for TW application No. 106144105 dated Aug. 3, 2018.
The First Office Action for TW application No. 106144106 dated Aug. 6, 2018.
The Second Office Action for TW application No. 10721146190 dated Dec. 5, 2018.
International Search Report for PCT application No. PCT/CN2017/116354 dated Mar. 16, 2018.
International Search Report for PCT application No. PCT/CN2017/116353 dated Mar. 21, 2018.
The IN1OA dated Oct. 29, 2019 by the IN Office.
The IN1OA dated Mar. 18, 2020 by the IN Office.
The CN4OA dated Dec. 14, 2020 by the CNIPA.
The EESR dated Aug. 7, 2020 by the EPO.
The Non-final OA dated Jun. 11, 2020 by the USPTO.
The Non-Final OA dated Oct. 2, 2020 by the USPTO from U.S. Appl. No. 16/465,741.
The IN1OA dated Dec. 25, 2020 by the IN Office.
The Decision of Rejection dated Feb. 10, 2021 by the CNIPA from application No. 201711322796.2.
The Non-final OA dated Apr. 13, 2021 from U.S. Appl. No. 16/465,741.

* cited by examiner

MODULAR POWER SUPPLY SYSTEM

CROSS-REFERENCE TO RELATED APPLICATIONS

This application is a continuation application of International Application No. PCT/CN2017/116354, filed on Dec. 15, 2017, which is based upon and claims priority to Chinese Patent Application No. 201611170857.3, filed on Dec. 16, 2016, Chinese Patent Application No. 201611191912.7, filed on Dec. 21, 2016, Chinese Patent Application No. 201710106946.X, filed on Feb. 27, 2017, Chinese Patent Application No. 201711322795.8, filed on Dec. 12, 2017, the entire content of all of which is incorporated herein by reference.

TECHNICAL FIELD

The present disclosure relates to the field of power electronics, and particularly to a modular power supply system.

BACKGROUND

Currently, in some applications of high voltage level (such as above 10 kV), such as Static Var Generator (SVG), Medium Variable-frequency Drive (MVD), and High Voltage Direct Current Transmission Light (HVDC-Light), etc., the systems are of high voltage level, and limited by the withstanding voltage level and cost of semiconductor devices, so the systems often adopt a circuit topology of cascaded power units.

The traditional topology of cascaded power units needs to equip a set of optical fiber, auxiliary power supply and local controller for each power unit, i.e., power converter. In such topology of cascaded power units, the number of power units that need to be cascaded increases with the increase of the voltage level, resulting in an increase in the number of optical fibers, auxiliary power supplies and local controllers. Therefore, the design of such a topology is complex, the cost is expensive, and its reliability is low.

FIG. 1 is a schematic structural view of a three-phase SVG system in the prior art. FIG. 2 is a schematic diagram of a more specific three-phase SVG system in the prior art. Each of the SVG systems in FIGS. 1 and 2 includes a three-phase circuit, and power units in each phase of circuit are connected in cascade.

As shown in FIG. 1, each phase of circuit of the SVG system is formed by cascading a plurality of power units 1. The term "cascade" as used herein is well-known in the art. That is, each power unit includes a first end $T_1$ and a second end $T_2$. A second end $T_2$ of one of adjacent two power units is connected to a first end $T_1$ of the other one of the adjacent two power units. The first end $T_1$ of the first power unit of each phase of circuit is connected to a corresponding phase of three-phase lines $U_A$, $U_B$ and $U_C$ of the three-phase grid via a filter inductor L, and the second ends of the last power units of the three phase of circuit are mutually connected.

As shown in FIG. 2, each phase of circuit of the SVG system is formed by cascading eight power units $P_1$ to $P_8$. Each power unit includes a first end and a second end as shown in FIG. 1, wherein a second end of one of adjacent two power units is connected to the first end of the other one of adjacent two power units. For example, the second end of the power unit $P_1$ is connected to the first end of the power unit $P_2$, the second end of the power unit $P_2$ is connected to the first end of the power unit $P_3$, and so on, and the second end of the power unit $P_7$ is connected to the first end of the power unit P8. Each of the first ends of the three power units $P_1$ in the three-phase circuit is connected to a corresponding phase of phases $U_A$, $U_B$ and $U_C$ of the three-phase grid G by a filter circuit (composed of an inductor L, a resistor R and a capacitor C), wherein the phases $U_A$, $U_B$ and $U_C$ of the three-phase grid G are connected to a load $R_{load}$. The second ends of the three power units $P_8$ in the three-phase circuit are connected to each other. Each power unit includes four power switch devices 2. Each power switch device 2 consists of a power semiconductor switch S and an anti-parallel body diode D or external diode D. A collector of the power semiconductor switch S is connected to a cathode of the diode D, and an emitter of the power semiconductor switch S is connected to an anode of the diode D. Since the power semiconductor switch S and the anti-parallel body diode D or the anti-parallel external diode D are generally used as a whole, for the sake of brevity, the anti-parallel body diode D or the anti-parallel external diode D will not be separately mentioned in the following description.

The power unit 1 shown in FIG. 1 may be a full-bridge (H-bridge) circuit, or may be other circuit topologies, such as a half-bridge circuit, a rectifier-inverter circuit, and the like. FIG. 3 is a schematic diagram of an H-bridge circuit (topology) in the prior art. For example, taking the power unit being an H-bridge circuit as an example, the H-bridge circuit, as shown in FIG. 3, includes power semiconductor switches $S_1$ to $S_4$ and a DC bus capacitor $C_B$. A first end of the power semiconductor switch $S_1$ is connected to a positive terminal of the DC bus capacitor $C_B$ and a first end of the power semiconductor switch $S_3$. A second end of the power semiconductor switch $S_1$ is connected to a first end of the power semiconductor switch $S_2$. A second end of the power semiconductor switch $S_2$ is connected to a negative terminal of the DC bus capacitor $C_B$ and a second end of the power semiconductor switch $S_4$. A second end of the power semiconductor switch $S_3$ is connected to a first end of the power semiconductor switch $S_4$. The second end of the power semiconductor switch $S_1$ as a first output end of the H-bridge circuit connects a first end $T_1$ of the power unit 1. A second end of the power semiconductor switch $S_3$ as a second output end of the H-bridge circuit connects a second end $T_2$ of the power unit 1.

FIG. 4 is a schematic diagram of a single phase SVG in the prior art. As shown in FIG. 4, the single phase SVG includes a charging portion 3, a power portion 4 and a control portion 5. The single phase SVG further includes a plurality of power units 40. Each of the power units 40 includes a first end and a second end as shown in FIG. 1. A first end of one of adjacent two power units 40 is connected to a second end of the other one of the adjacent two power units 40. FIG. 4 is a conventional cascaded solution applied to a 25 kV single phase SVG. Each phase of the SVG is formed by cascading a plurality of power units and then connected to the grid via filters and contactors, respectively. Each power unit 40 of the SVG typically employs one H-bridge circuit. The topology of the H-bridge circuit is shown in FIG. 3 and will not be repeatedly described here. Each power unit 40 of the SVG system further includes a DC bus capacitor $C_B$, and the connection relationship thereof is as shown in FIG. 4, wherein the charging portion 3 is used to precharge the DC bus capacitor $C_B$, and the control portion 5 is used to control the operation of the power portion 4.

As that can be seen from FIG. 4, in the conventional cascaded topology, in addition to including a main controller 50, each power unit 40, as a power converter, such as an H-bridge circuit, needs to be separately provided with a set of local controller 51, drive circuit 52, auxiliary power supply 53 and optical fiber 54, and the connection relationship thereof is as shown in FIG. 4. The main controller 50 outputs a main control signal to the local controller 51, and the local controller 51 generates a local control signal of the corresponding power unit according to the main control signal and output it to the drive circuit 52. The drive circuit 52 outputs a driving signal according to the local control signal to control the corresponding power unit to operate. For example, a 25 kV single phase SVG may often be implemented by the following two schemes. The first scheme: all power switch devices in the H-bridge circuit use common 1700V Insulated Gate Bipolar Transistor (IGBT), then a DC bus voltage of the single power unit 40 is 1000V. In consideration of redundancy, a total of 55 stages of power units are needed to be cascaded, so a total of 55 sets of local controllers 51, 55 sets of optical fibers 54 and 55 auxiliary power supplies 53 are required. Such a large number of local controllers 51, optical fibers 54 and auxiliary power supplies 53 will result in extremely complicated structural design of the SVG, and the cost is extremely high, and its reliability is low.

The second scheme: the power switch devices in the H-bridge circuit use high voltage IGBTs, such as 3300V IGBTs or even 6500V IGBTs, to increase the voltage level of the single power unit 40. In order to reduce the number of cascaded power units 40, local controllers 51, optical fibers 54 and auxiliary power supplies 53, the second scheme may often be employed. In the second scheme, if the 3300V IGBT is selected, the voltage level of each power unit 40 is doubled of the 1700V IGBT scheme, and the number of cascaded power units 40 may be reduced from 55 to 28, and the number of local controllers 51, optical fibers 54 and auxiliary power supplies 53 and the cost may be reduced by half as well. However, limited to the current level of semiconductor technology development, the cost of 3300V IGBT is still high. Under the same current level, the cost of 3300V IGBT is far expensive than twice the cost of 1700V IGBT. Therefore, the cost of the second scheme will far exceed the cost of the first scheme. If a 6500V IGBT is selected, the cost will be even high.

Therefore, either a power unit cascading scheme using a low voltage IGBT or a power unit cascading scheme using a high voltage IGBT has significant disadvantages.

FIG. 5 is a schematic diagram of an HVDC-Light system in the prior art. As shown in FIG. 5, the HVDC-Light includes a three-phase circuit, and each phase of circuit includes an upper half-bridge arm and a lower half-bridge arm. Each of the upper half-bridge arm and the lower half-bridge arm of each phase of circuit includes a plurality of cascaded power units 40 and an inductor L. Each power unit 40 includes a first end and a second end as shown in FIG. 1 as well. A first end of one of the adjacent two power units 40 is connected to a second end of the other one of the adjacent two power units 40. The inductor L of each upper bridge arm is connected to the inductor L of the corresponding lower bridge arm, and connection points between the two inductors L are respectively connected to the grid. The connection relationship is as shown in FIG. 5. Each power unit 40 of the HVDC-Light employs a half-bridge converter. Each power unit 40 of the HVDC-Light further includes a DC bus capacitor. Each power unit 40 of the HVDC-Light further needs to be connected to a drive circuit 52. The power unit 40 operates according to a driving signal output by the drive circuit 52. In addition to the main controller 50, each power unit 40 further needs to be provided with a set of local controller 51, optical fiber 54 and auxiliary power supply 53, the connection relationship of which is shown in FIG. 5.

The DC voltage of HVDC-Light is as high as hundreds of kilovolts, and the number of power units 40 to be cascaded is extremely large, so the above-mentioned problems are more serious. That is, the overall structure of HVDC-Light in the prior art is complicated, the cost is expensive, and the reliability is low.

In addition, the driving manner of the power semiconductor switch needs to be further considered and improved as well.

In addition, failure measures for power converter and power unit needs to be further considered and improved as well.

SUMMARY

It is an object of the present disclosure to provide a modular power supply system, to simplify a structure of a power electronic system, reduce cost, and improve reliability.

According to an aspect of the disclosure, a modular power supply system is provided, and configured to include: a main controller, configured to output a main control signal; N local controllers, wherein each of the local controllers is configured to receive the main control signal to output at least one local control signal; and N power units, in one-to-one correspondence with the N local controllers, wherein each of the power units includes a first end and a second end, and the second end of each of the power units is connected to the first end of an adjacent one of the power units, each of the power units is configured to include M power converters, wherein each of the power converters includes a third end and a fourth end, the fourth end of each of the power converters is connected to the third end of an adjacent one of the power converters, and the third end of a first one of the power converters is connected to the first end of the power unit, the fourth end of an M-th one of the power converters is connected to the second end of the power unit, and each of the power converters is configured to operate according to the local control signal output by a corresponding local controller, wherein both N and M are natural numbers greater than one.

In the present disclosure, by constituting a plurality of power converters as one power unit and adopting a set of local controller and optical fiber to control the plurality of power converters, the number of local controllers and optical fibers may be reduced, the structural design may be simplified, the cost may be reduced, and the reliability may be improved.

The present disclosure improves safety and reliability of the modular power supply system by bypassing the power converter in the power unit in the event of a fault and simultaneously stopping outputting of the local control signal for controlling the operation of the power converter.

The present disclosure is applicable to all topologies connected by AC/DC, DC/AC, DC/DC power converters, and is widely used.

BRIEF DESCRIPTION OF THE DRAWINGS

The above and other objects, features and advantages of the present disclosure will become more apparent from exemplary embodiments described in detail with reference to accompanying drawings.

DETAILED DESCRIPTION

Figure 1:
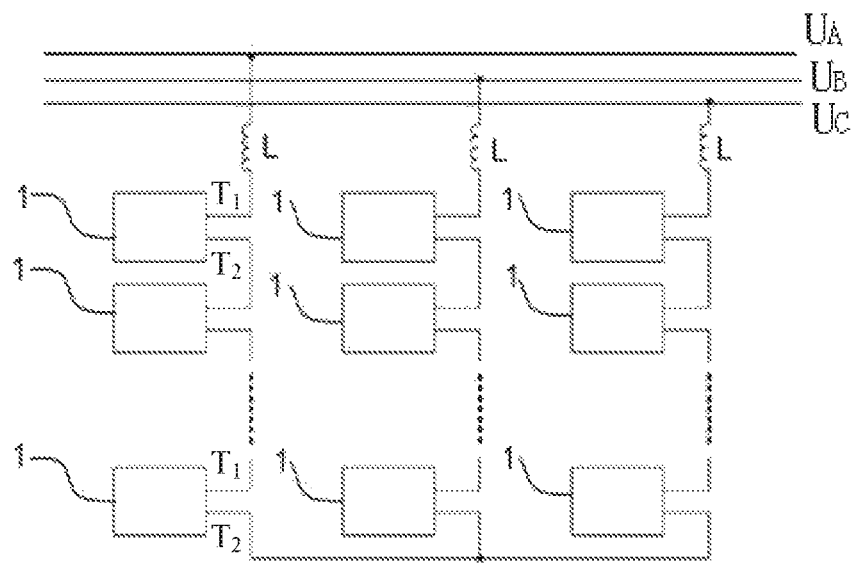
FIG. 1 is a schematic structural view of a three-phase SVG system in the prior art.
Figure 2:
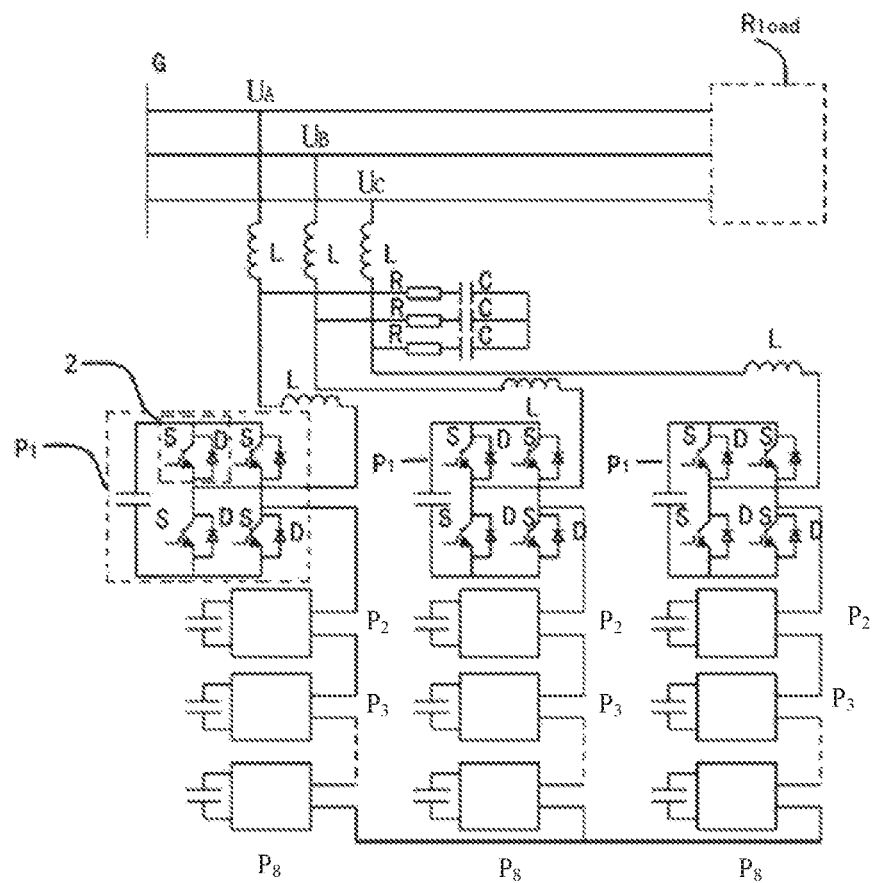
FIG. 2 is a schematic diagram of a more specific three-phase SVG system in the prior art.
Figure 3:
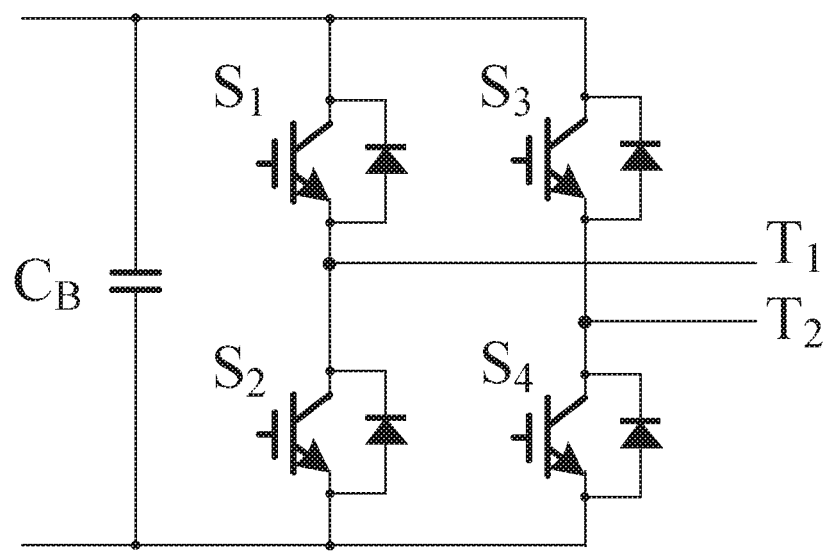
FIG. 3 is a schematic diagram of an H-bridge circuit (topology) in the prior art.
Figure 4:
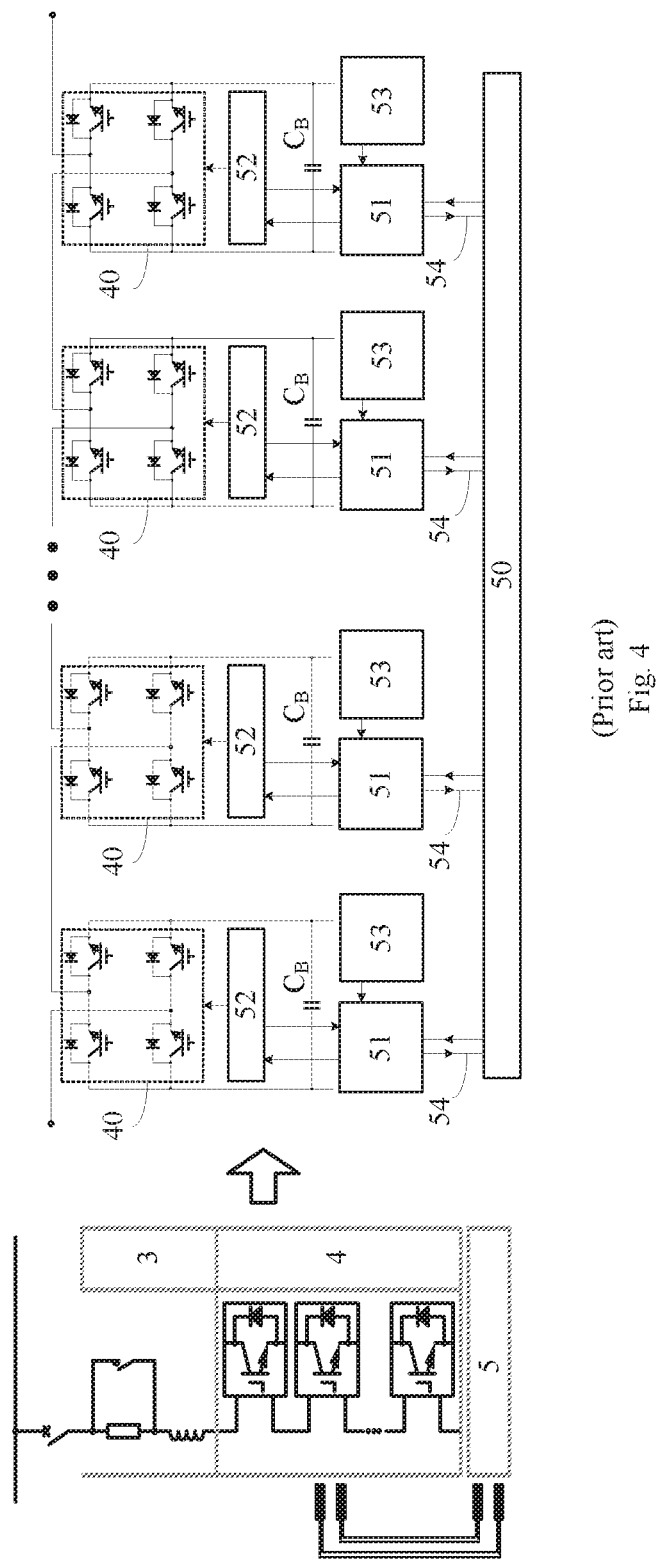
FIG. 4 is a schematic diagram of a single phase SVG in the prior art.
Figure 5:
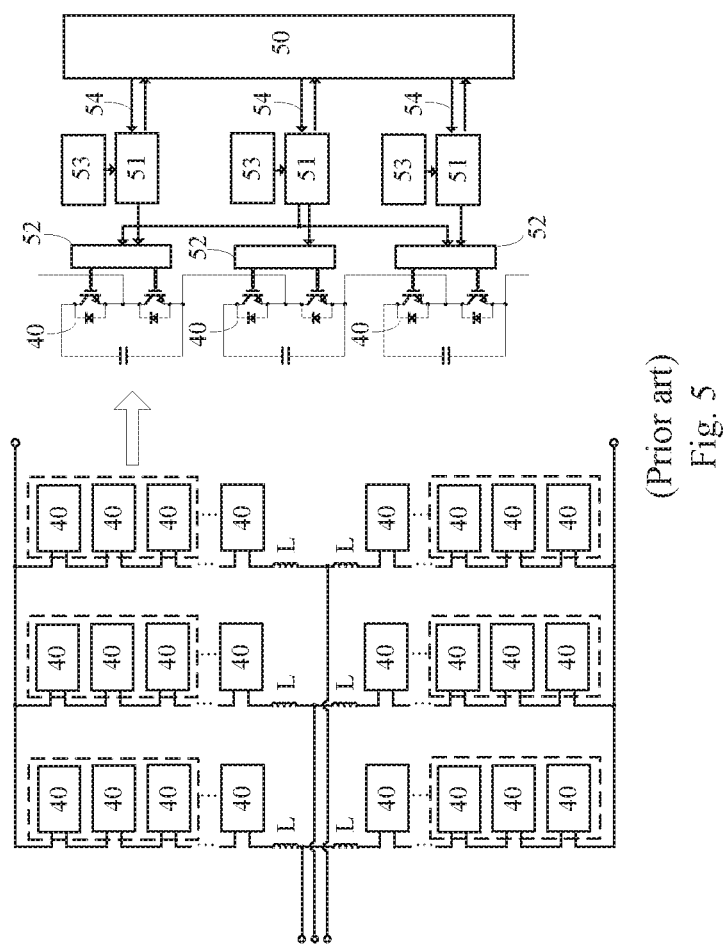
FIG. 5 is a schematic diagram of an HVDC-Light system in the prior art.

Example embodiments will now be described more fully with reference to the accompanying drawings. However, the example embodiments can be embodied in a variety of forms and should not be construed as being limited to the examples set forth herein; rather, these embodiments are provided to make the present disclosure more comprehensive and complete, and fully convey the concept of the example embodiments to those skilled in the art. The drawings are only schematic representations of the disclosure and are not necessarily drawn to scale. The same reference numerals in the drawings denote the same or similar parts, and the repeated description thereof will be omitted.

Furthermore, the described features, structures, or characteristics may be combined in any suitable manner in one or more embodiments. In the following description, numerous specific details are provided to give full understanding of embodiments of the present disclosure. However, one skilled in the art will appreciate that the technical solution of the present disclosure may be practiced, and one or more of the specific details may be omitted, or other methods, components, devices, steps, and the like may be employed. In other instances, well-known structures, methods, devices, implementations, or operations are not shown or described in detail to avoid obscuring aspects of the present disclosure.

Figure 6:
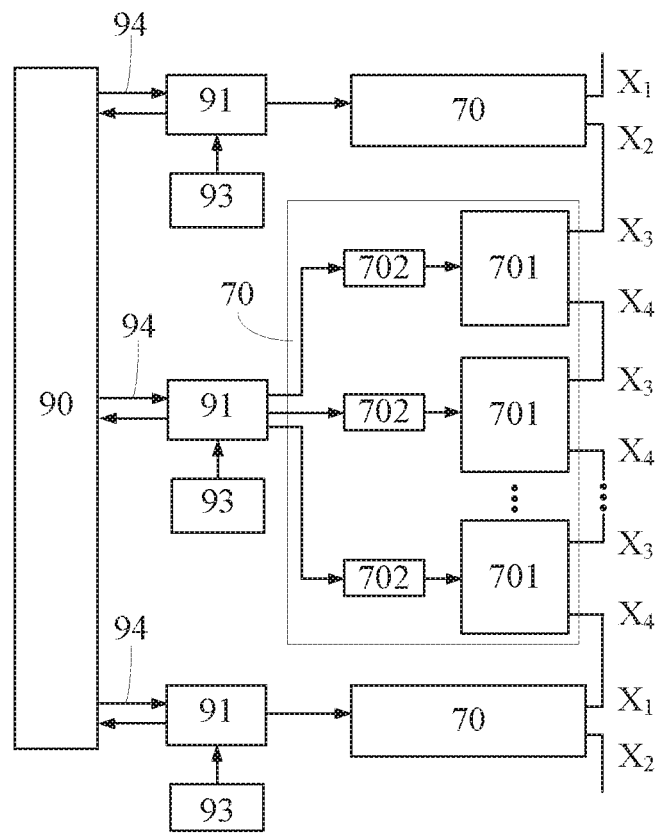
FIG. 6 is a block diagram of a modular power supply system in accordance with one embodiment of the present disclosure.

FIG. 6 is a block diagram of a modular power supply system in accordance with one embodiment of the present disclosure. As shown in FIG. 6, a modular power supply system of the present disclosure is configured to include: a main controller 90, N local controllers 91, and N power units 70, wherein N is a natural number greater than one.

The main controller 90 is configured to output a main control signal. The main control signal is, for example, one or more parameters set to control the overall operational state of the modular power supply system.

Each local controller 91 is configured to receive the aforementioned main control signal to output at least one local control signal. The local control signal is, for example, one or more parameters set to control the overall operational state of the corresponding power unit 70, or the local control signal is used to control the operational state of a portion of the power converters in the corresponding power unit 70.

The modular power supply system of the present disclosure may be configured to further include N auxiliary power supplies 93, which are in one-to-one correspondence with N local controllers 91. Each auxiliary power supply 93 is configured to provide power for a corresponding local controller 91.

The N power units 70 are in one-to-one correspondence with the N local controllers 91. Each power unit 70 includes a first end $X_1$ and a second end $X_2$. The second end $X_2$ of each power unit 70 is connected to the first end $X_1$ of an adjacent power unit 70. That is, the second end $X_2$ of one of the adjacent two power units 70 is connected to the first end $X_1$ of the other one of the adjacent two power units 70.

Each power unit 70 is configured to include M power converters 701, wherein each power converter 701 includes a third end $X_3$ and a fourth end $X_4$. The fourth end $X_4$ of each power converter is connected to the third end $X_3$ of an adjacent power converter 701. That is, the fourth end $X_4$ of one of the adjacent two power converters 701 is connected to the third end $X_3$ of the other one of the adjacent two power converters 701. M is a natural number greater than one. Thus, the third end $X_3$ of the first power converter 701 is connected to the first end $X_1$ of the power unit 70, and the fourth end $X_4$ of the M-th power converter 701 is connected to the second end $X_2$ of the power unit 70. Each power converter 701 is configured to operate according to a local control signal output by a corresponding local controller 91.

As an embodiment of the present disclosure, the aforementioned main control signal may be transmitted between the main controller 90 and each of the local controllers 91 via an optical isolation device 94, such as an optical fiber. In other embodiments, the main controller 90 and each local controller 91 can be connected by a magnetic isolation device, such as an isolation transformer. The connection manner between the main controller 90 and each local controller 91 is not limited to the above connection manner.

The modular power supply system of the present disclosure can be applied to fields such as SVG, MVD, HVDC-Light, and wind power generation systems.

As shown in FIG. 6, the present disclosure proposes to combine M power converters 701 into one power unit 70. One power unit 70 is provided with a set of local controller 91, optical fiber 94 and auxiliary power supply 93. That is, only one set of local controller 91, optical fiber 94 and auxiliary power supply 93 controls the M power converters 701. However, in the conventional solution, each power unit 40, that is, each power converter, needs to be configured with a set of local controller 51, optical fiber 54 and auxiliary power supply 53. Compared with the conventional solution, the number of local controllers 91, optical fibers 94 and auxiliary power supplies 93 in the modular power supply system of the present disclosure will be reduced to 1/M of the conventional solution. The present disclosure greatly simplifies the structural design of the modular power supply system, the cost is significantly reduced, and the reliability is greatly improved as well.

Figure 7:
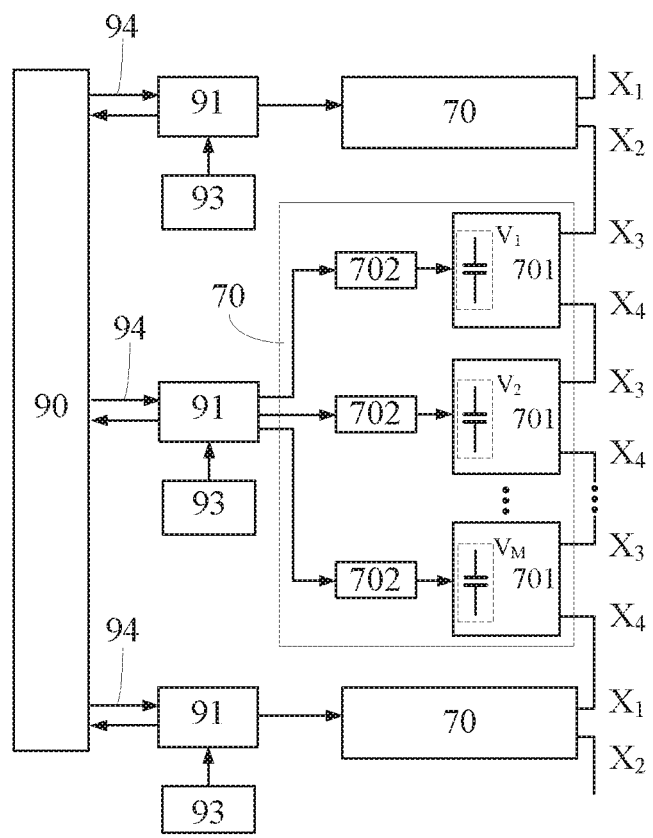
FIG. 7 is a block diagram of a modular power supply system in accordance with another embodiment of the present disclosure.

The present disclosure does not limit the DC bus voltage of each power converter 701. The DC bus voltages of the M power converters 701 in the modular power supply system of the present disclosure may be all identical, partially identical, or all different from each other. Based on FIG. 6, FIG. 7 is a block diagram of a modular power supply system in accordance with another embodiment of the present disclosure. As shown in FIG. 7, the DC bus voltages of the M power converters 701 in the power unit 70 may be $V_1$, $V_2$, ..., and $V_M$, respectively, where $V_1$, $V_2$, ... and $V_M$ may be all the same, i.e., $V_1=V_2=...=V_M$, or may be partially the same $V_1=V_2$, $V_1 \neq V_M$, or all different from each other, i.e., $V_1 \neq V_2 \neq ... \neq V_M$.

The present disclosure does not limit the topology used in each power converter 701 either. The M power converters 701 in the modular power supply system of the present disclosure may be any one kind of AC/DC converters, DC/AC converters and DC/DC converters. A power converter 701 in FIG. 7 represents any one kind of the applicable AC/DC, DC/AC and DC/DC topologies. The feature that the present disclosure does not limit the topology used in the M power converters 701 further lies in that the topology of the M power converters may be all identical, or partially identical. For example, the topology of all of the M power converters 701 in each power unit 70 of the modular power supply system of the present disclosure may be any one kind of full-bridge converters, half-bridge converters, neutral point clamped three-level converters, diode clamping three-level converters, flying capacitor three-level converters, full-bridge resonant converters and half-bridge resonant converters. Alternatively, for example, the topologies of the M power converters 701 in each power unit 70 of the modular power supply system of the present disclosure may be a combination of two or more kinds of full-bridge converters, half-bridge converters, neutral point clamped three-level converters, diode clamping three-level converters, flying capacitor three-level converters, full-bridge resonant converters and half-bridge resonant converters.

Each of the M power converters 701 in each power unit 70 of the modular power supply system of the present disclosure can be configured to include: at least one power semiconductor switch, wherein each of the local control signals is configured to control turn-on and turn-off of a corresponding power semiconductor switch.

As shown in FIG. 6 and FIG. 7, each power unit 70 in the modular power supply system of the present embodiment may include: M drive circuits 702, in one-to-one correspondence with the M power converters 701, wherein each of the drive circuits 702 is configured to be connected to the power semiconductor switch of the corresponding power converter 701, and receive at least one local control signal output by the corresponding local controller 91, and output at least one driving signal according to the at least one local control signal to control turn-on and turn-off of the power semiconductor switches in the corresponding M power converters 701.

In other embodiments, each power unit in the modular power supply system may include: a plurality of drive circuits, wherein the number of the plurality of drive circuits is equal to the number of the power semiconductor switch in this power unit. Each of the drive circuits is configured to be connected to the corresponding power semiconductor switch, to receive a corresponding local control signal and output a driving signal according to the corresponding local control signal to control turn-on and turn-off of the corresponding power semiconductor switch.

Figure 8:
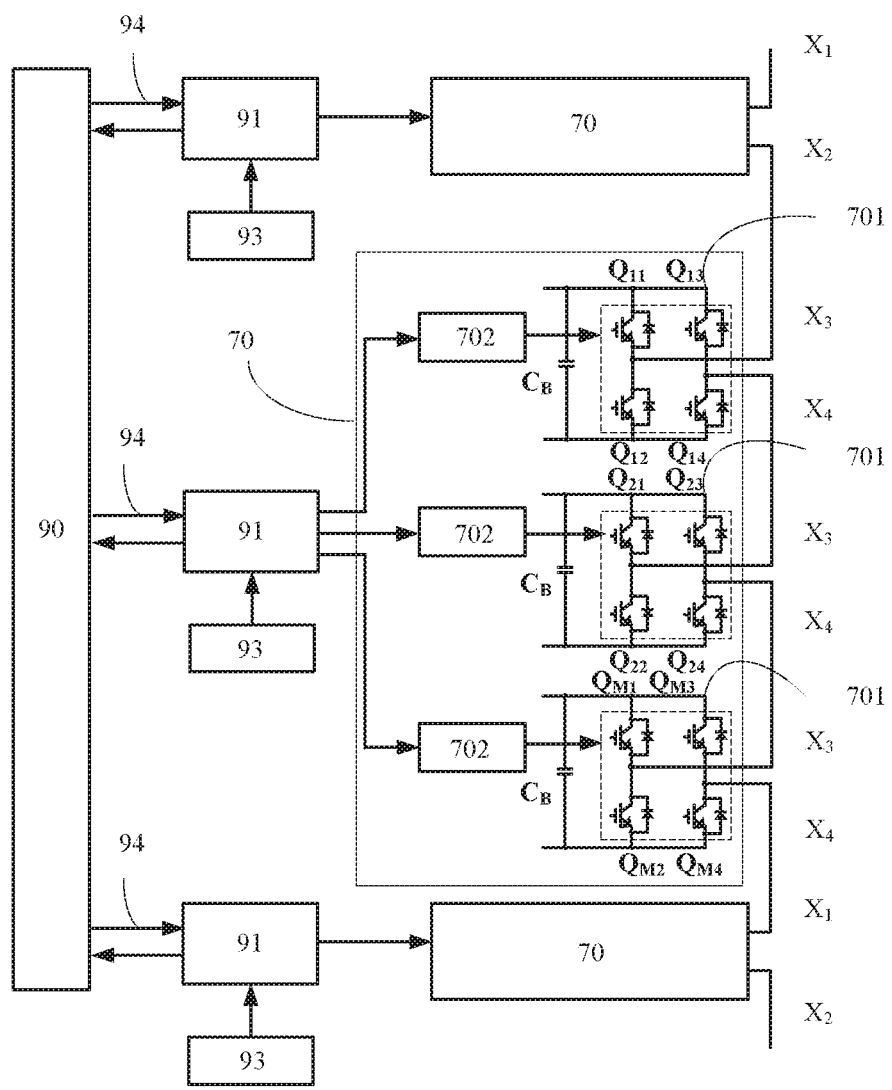
FIG. 8 is a block diagram of a modular power supply system in accordance with another embodiment of the present disclosure.

FIG. 8 is a block diagram of a modular power supply system in accordance with another embodiment of the present disclosure. As shown in FIG. 8, the topologies of all of the M power converters 701 of each power unit 70 in the modular power supply system of the present embodiment employs a full-bridge converter, such as an H-bridge circuit. Each H-bridge circuit 701 includes four power semiconductor switches and a DC bus capacitor. The four power semiconductor switches form two bridge arms. For convenience of explanation, the four power semiconductor switches are respectively defined as an upper power semiconductor switch of one bridge arm, a lower power semiconductor switch of the one bridge arm, an upper power semiconductor switch of the other bridge arm and a lower power semiconductor switch of the said the other bridge arm. In the embodiment, one end of the upper power semiconductor switch of the one bridge arms is connected to one end of the upper power semiconductor switch of the said the other bridge arm and one end of the DC bus capacitor. The other end of the lower power semiconductor switch of the one bridge arm is connected to the other end of the lower power semiconductor switch of the said the other bridge arm and the other end of the DC bus capacitor. The upper power semiconductor switch and the lower power semiconductor switch of the one bridge arm are connected to a third end $X_3$. The upper power semiconductor switch and the lower power semiconductor switch of the said the other bridge arm are connected to the fourth end $X_4$. Taking the M-th power converter 701 as an example, the power converter 701 includes two bridge arms and a DC bus capacitor $C_B$. One end of the upper power semiconductor switch $Q_{M1}$ of one bridge arm is connected to one end of the upper power semiconductor switch $Q_{M3}$ of the other bridge arm and one end of the DC bus capacitor $C_B$. The other end of the lower power semiconductor switch $Q_{M2}$ of the one bridge arm is connected to the other end of the lower power semiconductor switch $Q_{M4}$ of the said the other bridge arm and the other end of the DC bus capacitor $C_B$. A connection point of the upper power semiconductor switch $Q_{M1}$ and the lower power semiconductor switch $Q_{M2}$ of one bridge arm is the third end $X_3$. A connection point of the upper power semiconductor switch $Q_{M3}$ and the lower power semiconductor switch $Q_{M4}$ of the other bridge arm is the fourth end $X_4$.

In this embodiment, the third end $X_3$ of the first H-bridge circuit 701 in each power unit 70 is connected to the first end $X_1$ of the power unit 70, and the fourth end $X_4$ of the first H-bridge circuit 701 is connected to the third end $X_3$ of the second H-bridge circuits 701, and so on, the fourth end $X_4$ of the (M−1)-th H-bridge circuit 701 is connected to the third end $X_3$ of the M-th H-bridge circuit 701, and the fourth end $X_4$ of the M-th power converter is connected to the second end $X_2$ of the power unit 70.

The local controller 91 corresponding to each power unit 70 outputs at least one local control signal for controlling the turn-on and turn-off of the power semiconductor switches in the corresponding H-bridge circuit 701. In this embodiment, each H-bridge circuit 701 needs four local control signals to respectively control the corresponding power semiconductor switches to be turned on and off. Each power unit 70 needs 4*M local control signals. That is, the local controller needs to output 4*M local control signals, to control the turn-on and turn-off of the corresponding power semiconductor switches. That is, each of the power semiconductor switches $Q_{11}$-$Q_{14}$ needs a corresponding local control signal.

As shown in FIG. 8, each power unit 70 further includes M drive circuits 702. The drive circuits 702 are in one-to-one correspondence with M H-bridge circuits 701. Each drive circuit 702 receives corresponding local control signals and outputs at least one driving signal to respectively control the turn-on and turn-off of the corresponding power semiconductor switches. Specifically, each drive circuit 702 receives the corresponding four local control signals, and outputs four driving signals to respectively control the turn-on and turn-off of the corresponding power semiconductor switches. Taking the drive circuit 702 corresponding to the first H-bridge circuit 701 as an example, the drive circuit outputs four driving signals to respectively control the turn-on and turn-off of the power semiconductor switches $Q_{11}$-$Q_{14}$.

In other embodiments, each power unit 70 includes a plurality of drive circuits. The number of drive circuits is equal to 4*M. Each drive circuit is connected to a corresponding power semiconductor switch, and receives a corresponding local control signal to output a driving signal for controlling the turn-on and turn-off of the corresponding power semiconductor switch. Taking the four drive circuits corresponding to the first H-bridge circuit 701 as an example, the four drive circuits are respectively connected to the power semiconductor switches $Q_{11}$-$Q_{14}$. Each drive circuit outputs a driving signal to control the turn-on and turn-off of the corresponding one of the power semiconductor switches $Q_{M1}$-$Q_{M4}$.

Figure 9:
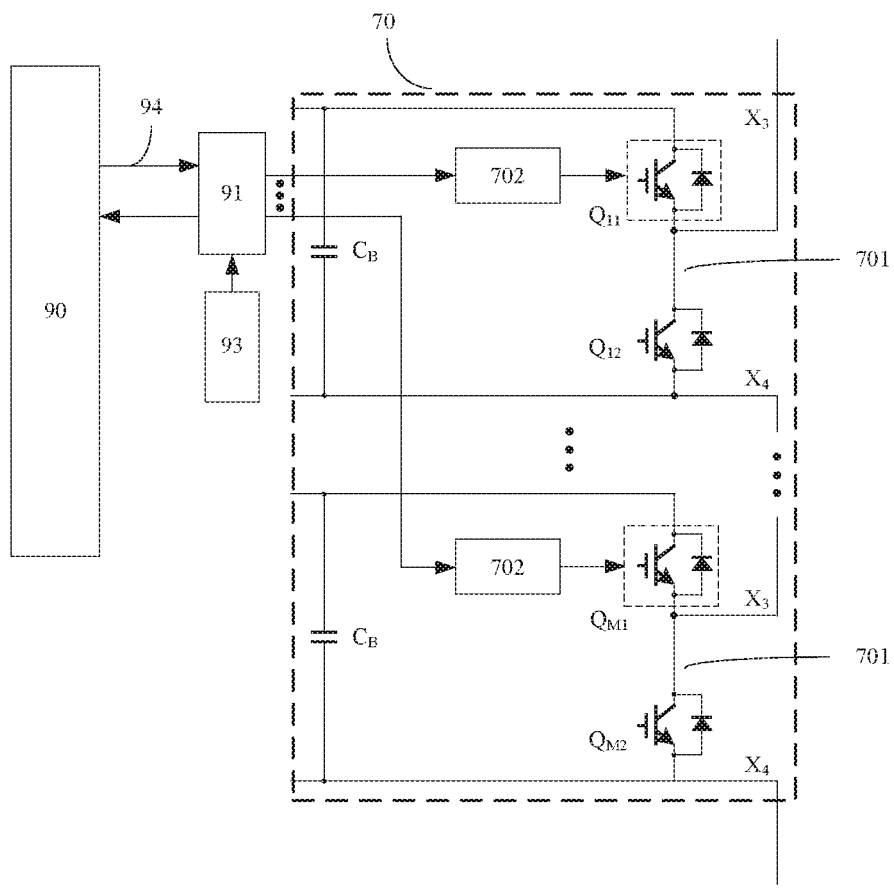
FIG. 9 is a block diagram of a modular power supply system in accordance with another embodiment of the present disclosure.

FIG. 9 is a block diagram of a modular power supply system in accordance with another embodiment of the present disclosure. As shown in FIG. 9, the topologies of all of the M power converters 701 of each power unit 70 in the modular power supply system of the present embodiment employ half-bridge converters. Each of the half-bridge converters 701 includes two power semiconductor switches and a DC bus capacitor, the connection relationship of which is shown in FIG. 9. One end of one power semiconductor is connected to one end of the DC bus capacitor $C_B$, the other end of the one power semiconductor is connected to one end of the other power semiconductor switch, and the other end of the said the other power semiconductor switch is connected to the other end of the DC bus capacitor $C_B$. A connection point at which the two power semiconductor switches are connected to each other is the third end $X_3$, and the other end of the said the other power semiconductor switch is the fourth end $X_4$. Taking the first power converter 70 as an example, the power converter 701 includes two power semiconductor switches $Q_{11}$, $Q_{12}$ and a DC bus capacitor $C_B$. One end of the power semiconductor switch $Q_{11}$ is connected to one end of the DC bus capacitor $C_B$, the other end of the power semiconductor switch $Q_{11}$ is connected to one end of the power semiconductor switch $Q_{12}$, and the other end of the power semiconductor switch $Q_{12}$ is connected to the other end of the DC bus capacitor $C_B$. The connection point of the power semiconductor switch $Q_{11}$ and the power semiconductor switch $Q_{12}$ is the third end $X_3$ of the first power converter 701, and the other end of the power semiconductor switch $Q_{12}$ is the fourth end $X_4$ of the first power converter 701.

In this embodiment, the third end $X_3$ of the first half-bridge converter (i.e., the first power converter 701) in each power unit 70 is connected to the first end $X_1$ of the power unit 70, the fourth end $X_4$ of the first half bridge converter is connected to the third end $X_3$ of the second half-bridge converter, and so on, the fourth end $X_4$ of the (M−1)-th half-bridge converter is connected to the third end $X_3$ of the M-th half-bridge converter, and the four end $X_4$ of the M-th half-bridge converter is connected to the second end $X_2$ of the power unit 70.

In this embodiment, the local controller 91 corresponding to each power unit 70 can output 2*M local control signals, for controlling the turn-on and turn-off of the power semiconductor switches $Q_{11}$-$Q_{M2}$ in the half-bridge converter 701. That is, each of the power semiconductor switches $Q_{11}$-$Q_{M2}$ needs a local control signal.

As shown in FIG. 9, each power unit 70 further includes M drive circuits 702. The drive circuits 702 are in one-to-one correspondence with the M half-bridge converters 701. Each drive circuit 702 receives corresponding local control signals and outputs at least one driving signal to respectively control the turn-on and turn-off of the corresponding power semiconductor switches. Specifically, each drive circuit 702 receives two corresponding local control signals, and outputs two driving signals to respectively control the turn-on and turn-off of the corresponding power semiconductor switches. Taking the drive circuit 702 corresponding to the first half-bridge converter 701 as an example, the drive circuit outputs two driving signals for controlling the turn-on and turn-off of the power semiconductor switches $Q_{11}$-$Q_{12}$ respectively.

In other embodiments, each power unit 70 includes a plurality of drive circuits. The number of the drive circuits is equal to 2*M. Each drive circuit is connected to a corresponding one of the power semiconductor switches, and receives a corresponding local control signal to output a driving signal to control the turn-on and turn-off of the corresponding power semiconductor switch. Taking the two drive circuits corresponding to the first half-bridge converter 701 as an example, the two drive circuits are respectively connected to the power semiconductor switches $Q_{11}$-$Q_{12}$, and each drive circuit outputs a driving signal to control the turn-on and turn-off of the corresponding one of the power semiconductor switches $Q_{11}$-$Q_{12}$.

Figure 10:
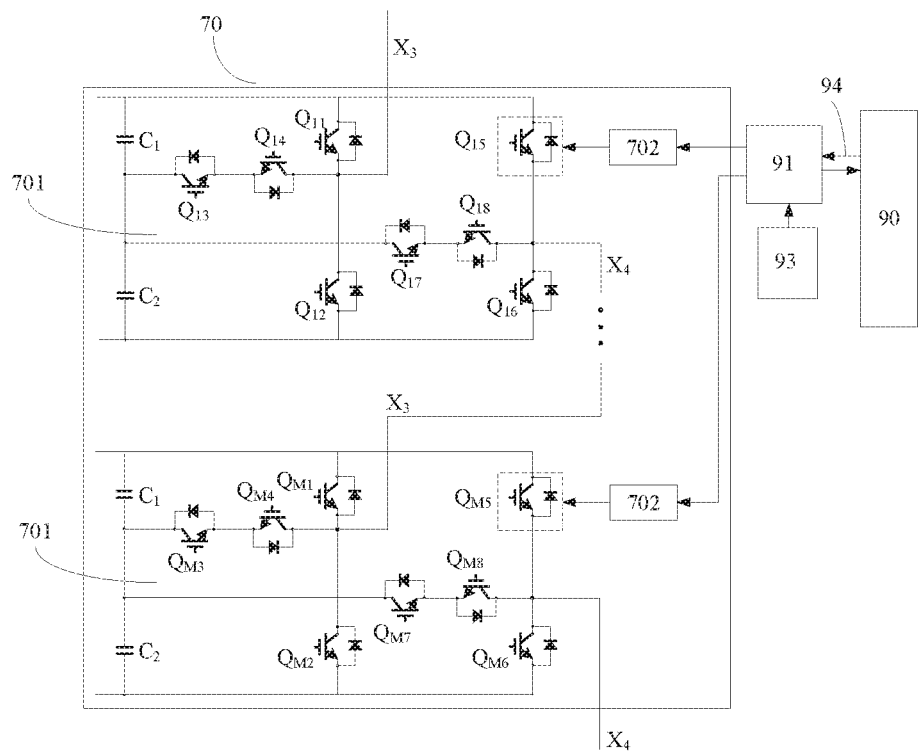
FIG. 10 is a block diagram of a modular power supply system in accordance with another embodiment of the present disclosure.

FIG. 10 is a block diagram of a modular power supply system in accordance with another embodiment of the present disclosure. As shown in FIG. 10, the topologies of all of the M power converters 701 of each power unit 70 in the modular power supply system of the present embodiment employ neutral point clamped three-level converters. Each of the neutral point clamped three-level converters 701 includes eight power semiconductor switches and two DC bus capacitors, the connection relationship of which is shown in FIG. 10. Taking the first power converter 701 as an example, one end of the power semiconductor switch $Q_{11}$ is connected to one end of the DC bus capacitor $C_1$ and one end of the power semiconductor switch $Q_{15}$, the other end of the DC bus capacitor $C_1$ is connected to one end of the DC bus capacitor $C_2$, and the other end of the power semiconductor switch $Q_{11}$ is connected to one end of the power semiconductor switch $Q_{12}$. A connection point of the power semiconductor switch $Q_{11}$ and the power semiconductor switch $Q_{12}$ is the third end $X_3$ of the first power converter 701. The other end of the power semiconductor switch $Q_{15}$ is connected to one end of the power semiconductor switch $Q_{16}$. The other end of the power semiconductor switch $Q_{12}$ is connected to the other end of the DC bus capacitor $C_2$ and the other end of the power semiconductor switch $Q_{16}$. A connection point of the power semiconductor switch $Q_{15}$ and the power semiconductor switch $Q_{16}$ is the fourth end $X_4$ of the first power converter 701. One end of the power semiconductor switch $Q_{13}$ is connected to the said the other end of the DC bus capacitor $C_1$, the other end of the power semiconductor switch $Q_{13}$ is connected to one end of the power semiconductor switch $Q_{14}$, and the other end of the power semiconductor switch $Q_{14}$ is connected to the said the other end of the power semiconductor switch $Q_{11}$. One end of the power semiconductor switch $Q_{17}$ is connected to the said the other end of the DC bus capacitor $C_1$, the other end of the power semiconductor switch $Q_{17}$ is connected to one end of the power semiconductor switch $Q_{18}$, and the other end of the power semiconductor switch $Q_{18}$ is connected to the said the other end of the power semiconductor switch $Q_{15}$.

In this embodiment, the third end $X_3$ of the first neutral point clamped three-level converter in each power unit 70 is connected to the first end $X_1$ of the power unit 70, the fourth end $X_4$ of first neutral point clamped three-level converter is connected to the third end $X_3$ of the second neutral point clamped three-level converter, and so on, the fourth end $X_4$ of the (M−1)-th neutral point clamped three-level converter is connected to the third end $X_3$ of the M-th neutral point clamped three-level converter, and the fourth end $X_4$ of the M-th neutral point clamped three-level converter is connected to the second end $X_2$ of the power unit 70.

In this embodiment, the local controller 91 corresponding to each power unit can output 8*M local control signals, for controlling the turn-on and turn-off of the power semiconductor switches $Q_{11}$-$Q_{M8}$ in the neutral point clamped three-level converter 701. That is, each of the power semiconductor switches $Q_{11}$-$Q_{M8}$ needs a local control signal.

As shown in FIG. 10, each power unit 70 further includes M drive circuits 702. The M drive circuits 702 are in one-to-one correspondence with the M neutral point clamped three-level converters 701. Each drive circuit 702 receives corresponding local control signals and outputs at least one driving signal to respectively control the turn-on and turn-off of the corresponding power semiconductor switches. Specifically, each drive circuit 702 receives the corresponding eight local control signals, and outputs eight driving signals to respectively control the turn-on and turn-off of the corresponding power semiconductor switches. Taking the drive circuit 702 corresponding to the first neutral point clamped three-level converter 701 as an example, the drive circuit outputs eight driving signals for controlling the turn-on and turn-off of the power semiconductor switches $Q_{11}$-$Q_{18}$ respectively.

In other embodiments, each power unit 70 includes a plurality of drive circuits. The number of the drive circuits is equal to 8*M. Each drive circuit is connected to a corresponding one of the power semiconductor switches, and receives a corresponding local control signal to output a driving signal to control the turn-on and turn-off of the corresponding power semiconductor switch. Taking the eight drive circuits corresponding to the first neutral point clamped three-level converter 701 as an example, the eight drive circuits are respectively connected to the power semiconductor switches $Q_{11}$-$Q_{18}$ and each drive circuit outputs a driving signal to control the turn-on and turn-off of the corresponding one of the power semiconductor switches $Q_{11}$-$Q_{18}$.

Figure 11:
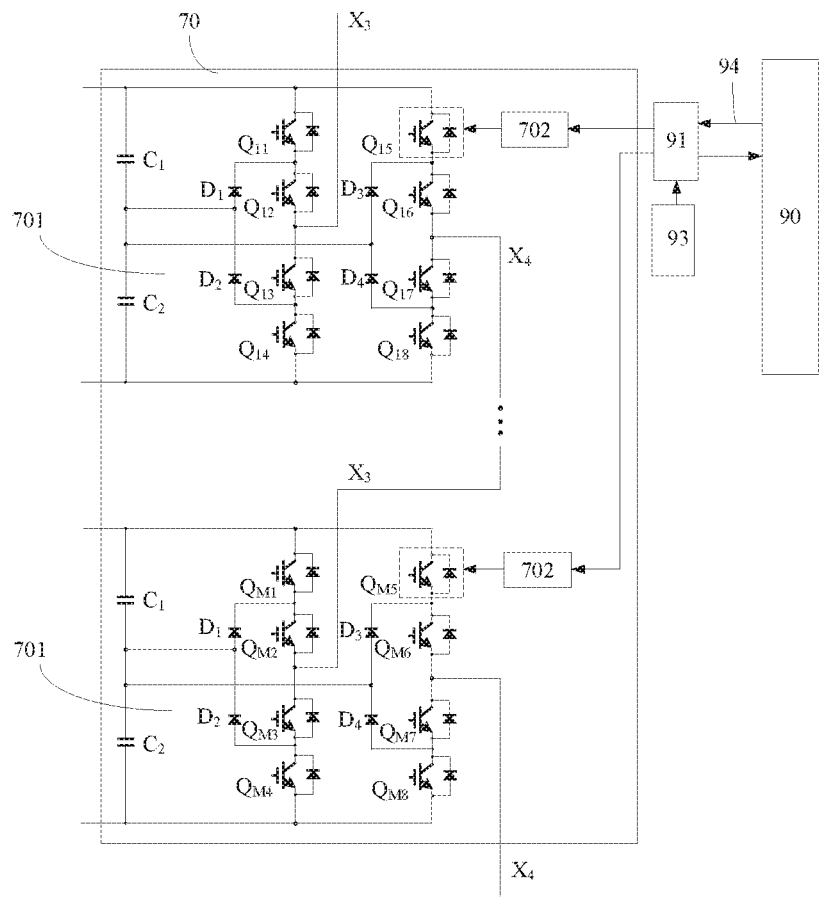
FIG. 11 is a block diagram of a modular power supply system in accordance with another embodiment of the present disclosure.

FIG. 11 is a block diagram of a modular power supply system in accordance with another embodiment of the present disclosure. As shown in FIG. 11, the topologies of all of the M power converters 701 of each power unit 70 in the modular power supply system of the present embodiment employ diode clamping three-level converters. Each of the diode clamping three-level converters 701 includes eight power semiconductor switches, four clamping diodes and two DC bus capacitors, the connection relationship of which is shown in FIG. 11. Taking the first power converter 701 as an example, one end of the power semiconductor switch $Q_{11}$ is connected to one end of the DC bus capacitor $C_1$ and one end of the power semiconductor switch $Q_{15}$, the other end of the power semiconductor switch $Q_{11}$ is connected to one end of the power semiconductor switch $Q_{12}$ and a cathode of the clamping diode $D_1$, the other end of the power semiconductor switch $Q_{12}$ is connected to one end of the power semiconductor switch $Q_{13}$, the other end of the power semiconductor switch $Q_{13}$ is connected to one end of the power semiconductor switch $Q_{14}$ and an anode of the clamping diode $D_2$, the other end of the DC bus capacitor $C_1$ is connected to one end of the DC bus capacitor $C_2$, the other end of the power semiconductor switch $Q_{14}$ is connected to the other end of the DC bus capacitor $C_2$, and an anode of the clamping diode $D_1$ is connected to a cathode of the clamping diode $D_2$ and the said the other end of the DC bus capacitor $C_1$. A connection point of the power semiconductor switch $Q_{12}$ and the power semiconductor switch $Q_{13}$ is the third end $X_3$ of the first power converter 701. The other end of the power semiconductor switch $Q_{15}$ is connected to one end of the power semiconductor switch $Q_{16}$ and a cathode of the clamping diode $D_3$, the other end of the power semiconductor switch $Q_{16}$ is connected to one end of the power semiconductor switch $Q_{17}$. The other end of the semiconductor switch $Q_{17}$ is connected to one end of the power semiconductor switch $Q_{18}$ and an anode of the clamping diode $D_4$, the other end of the power semiconductor switch $Q_{18}$ is connected to the said the other end of the DC bus capacitor $C_2$, and an anode of the clamping diode $D_3$ is connected to a cathode of the clamping diode $D_4$ and the said the other end of the DC bus capacitor $C_1$. A connection point of the power semiconductor switch $Q_{16}$ and the power semiconductor switch $Q_{17}$ is the fourth end $X_4$ of the first power converter 701.

In this embodiment, the third end $X_3$ of the first diode clamping three-level converter in each power unit 70 is connected to the first end $X_1$ of the power unit 70, the fourth end $X_4$ of first diode clamping three-level converter is connected to the third end $X_3$ of the second diode clamping three-level converter, and so on, the fourth end $X_4$ of the (M−1)-th diode clamping three-level converter is connected to the third end $X_3$ of the M-th diode clamping three-level converter, and the fourth end $X_4$ of the M-th diode clamping three-level converter is connected to the second end $X_2$ of the power unit 70.

In this embodiment, the local controller 91 corresponding to each power unit can output 8*M local control signals, for controlling the turn-on and turn-off of the power semiconductor switches $Q_{11}$-$Q_{18}$ in the neutral point clamped three-level converter 701. That is, each of the power semiconductor switches $Q_{11}$-$Q_{M8}$ needs a local control signal.

As shown in FIG. 11, each power unit 70 further includes M drive circuits 702. The drive circuits 702 are in one-to-one correspondence with the M diode clamping three-level converters 701. Each drive circuit 702 receives corresponding local control signals and outputs at least one driving signal to respectively control the turn-on and turn-off of the corresponding power semiconductor switches. Specifically, each drive circuit 702 receives the corresponding eight local control signals, and outputs eight driving signals to respectively control the turn-on and turn-off of the corresponding power semiconductor switches. Taking the drive circuit 702 corresponding to the first diode clamping three-level converter 701 as an example, the drive circuit outputs eight driving signals for controlling the turn-on and turn-off of the power semiconductor switches $Q_{11}$-$Q_{18}$ respectively.

In other embodiments, each power unit 70 includes a plurality of drive circuits. The number of the drive circuits is equal to 8*M. Each drive circuit is connected to a corresponding one of the power semiconductor switches, and receives a corresponding local control signal for outputting a driving signal to control the turn-on and turn-off of the corresponding power semiconductor switch. Taking the eight drive circuits corresponding to the first diode clamping three-level converter 701 as an example, the eight drive circuits are respectively connected to the power semiconductor switches $Q_{11}$-$Q_{18}$ and each drive circuit outputs a driving signal to control the turn-on and turn-off of the corresponding one of the power semiconductor switches $Q_{11}$-$Q_{18}$.

Figure 12:
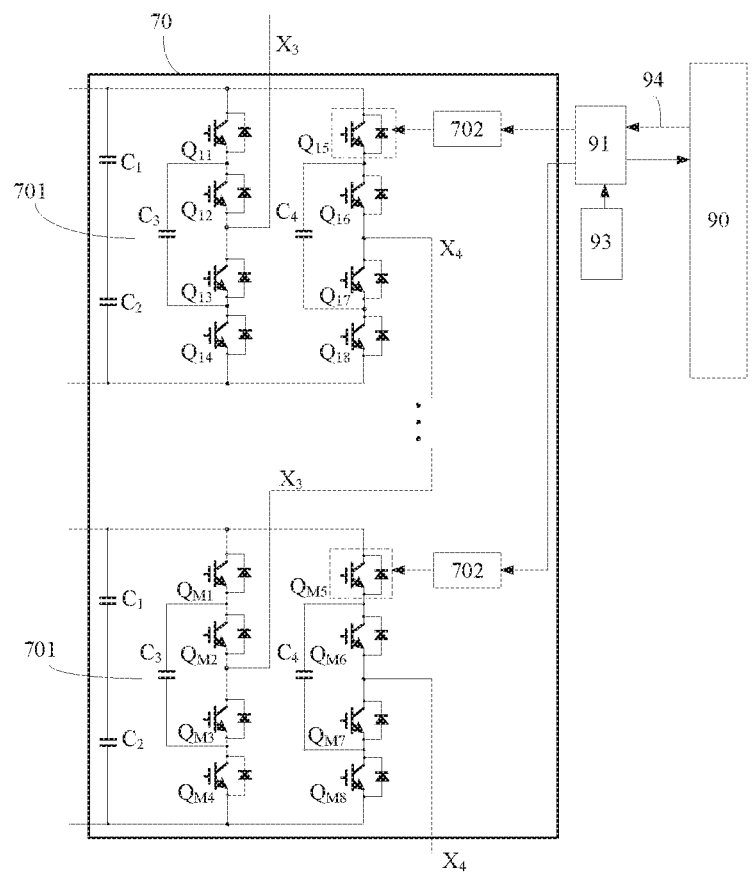
FIG. 12 is a block diagram of a modular power supply system in accordance with another embodiment of the present disclosure.

FIG. 12 is a block diagram of a modular power supply system in accordance with another embodiment of the present disclosure. As shown in FIG. 12, the topologies of all of the M power converters 701 of each power unit 70 in the modular power supply system of the present embodiment employ flying capacitor three-level converters. Each of the flying capacitor three-level converters 701 includes eight power semiconductor switches, two DC bus capacitors and two flying capacitors, the connection relationship of which is shown in FIG. 12. Taking the first power converter 701 as an example, one end of the power semiconductor switch $Q_{11}$ is connected to one end of the DC bus capacitor $C_1$ and one end of the power semiconductor switch $Q_{15}$, the other end of the power semiconductor switch $Q_{11}$ is connected to one end of the power semiconductor switch $Q_{12}$ and one end of the flying capacitor $C_3$, the other end of the power semiconductor switch $Q_{12}$ is connected to one end of the power semiconductor switch $Q_{13}$, the other end of the power semiconductor switch $Q_{13}$ is connected to one end of the power semiconductor switch $Q_{14}$ and the other end of the flying capacitor $C_3$, the other end of the DC bus capacitor $C_1$ is connected to one end of the of DC bus capacitor $C_2$, and the other end of the power semiconductor switch $Q_{14}$ is connected to the other end of the DC bus capacitor $C_2$. A connection point of the power semiconductor switch $Q_{12}$ and the power semiconductor switch $Q_{13}$ is the third end $X_3$ of the first power converter 701. The other end of the power semiconductor switch $Q_{15}$ is connected to one end of the power semiconductor switch $Q_{16}$ and one end of the flying capacitor $C_4$, the other end of the power semiconductor switch $Q_{16}$ is connected to one end of the power semiconductor switch $Q_{17}$, the other end of the power semiconductor switch $Q_{17}$ is connected to one end of the power semiconductor switch $Q_{18}$ and the other end of the flying capacitor $C_4$, and the other end of the power semiconductor switch $Q_{18}$ is connected to the other end of the DC bus capacitor $C_2$. A connection point of the power semiconductor switches $Q_{16}$ and the power semiconductor switch $Q_{17}$ is a fourth end $X_4$ of the first power converter 701.

In this embodiment, the third end $X_3$ of the first flying capacitor three-level converter in each power unit 70 is connected to the first end $X_1$ of the power unit 70, the fourth end $X_4$ of first flying capacitor three-level converter is connected to the third end $X_3$ of the second flying capacitor three-level converter, and so on, the fourth end $X_4$ of the (M−1)-th flying capacitor three-level converter is connected to the third end $X_3$ of the M-th flying capacitor three-level converter, and the fourth end $X_4$ of the M-th flying capacitor three-level converter is connected to the second end $X_2$ of the power unit 70.

In this embodiment, the local controller 91 corresponding to each power unit can output 8*M local control signals, for controlling the turn-on and turn-off of the power semiconductor switches $Q_{11}$-$Q_{M8}$ in the neutral point clamped three-level converter 701. That is, each of the power semiconductor switches $Q_{11}$-$Q_{M8}$ needs a local control signal.

As shown in FIG. 12, each power unit 70 further includes M drive circuits 702. The drive circuits 702 are in one-to-one correspondence with the M flying capacitor three-level converters 701. Each drive circuit 702 receives corresponding local control signals and outputs at least one driving signal to respectively control the turn-on and turn-off of the corresponding power semiconductor switches. Specifically, each drive circuit 702 receives the corresponding eight local control signals, and outputs eight driving signals to respectively control the turn-on and turn-off of the corresponding power semiconductor switches. Taking the drive circuit 702 corresponding to the first flying capacitor three-level converter 701 as an example, the drive circuit outputs eight driving signals for controlling the turn-on and turn-off of the power semiconductor switches $Q_{11}$-$Q_{18}$ respectively.

In other embodiments, each power unit 70 includes a plurality of drive circuits. The number of the drive circuits is equal to 8*M. Each drive circuit receives a corresponding local control signal and outputs a driving signal to control the turn-on and turn-off of the corresponding power semiconductor switch. Taking the eight drive circuits corresponding to the first flying capacitor three-level converter 701 as an example, the eight drive circuits are respectively connected to the power semiconductor switches $Q_{11}$-$Q_{18}$ and each drive circuit outputs a driving signal to control the turn-on and turn-off of the corresponding one of the power semiconductor switches $Q_{11}$-$Q_{18}$.

The M power converters 701 in the modular power supply system of FIGS. 8-12 may be AC/DC converters or DC/AC converters, but not limited thereto, and may be converters of other topologies as well.

Figure 13:
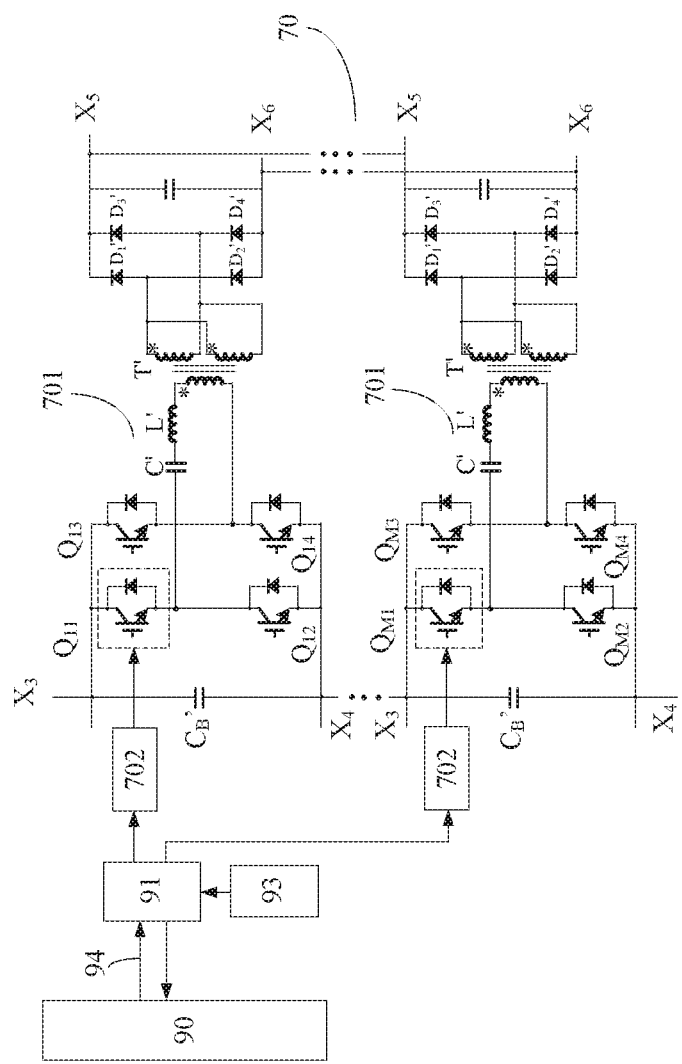
FIG. 13 is a block diagram of a modular power supply system in accordance with another embodiment of the present disclosure.

FIG. 13 is a block diagram of a modular power supply system in accordance with another embodiment of the present disclosure. As shown in FIG. 13, the topologies of all of the M power converters 701 of each power unit 70 in the modular power supply system of the present embodiment employ full-bridge resonant converters. Each of the full-bridge resonant converters 701 includes a full-bridge circuit, a resonant circuit, a transformer and a rectifier bridge, the connection relationship of which is as shown in FIG. 13. Taking the first full-bridge LLC resonant converter 701 as an example, the full-bridge circuit includes four power semiconductor switches and one DC bus capacitor. One end of the power semiconductor switch $Q_{11}$ is connected to one end of the DC bus capacitor $C_B'$ and one end of the power semiconductor switch $Q_{13}$, the other end of the power semiconductor switch $Q_{11}$ is connected to one end of the power semiconductor switch $Q_{12}$, the other end of the power semiconductor switch $Q_{13}$ is connected to one end of the power semiconductor switch $Q_{14}$, and the other end of the power semiconductor switch $Q_{12}$ is connected to the other end of the DC bus capacitor $C_B'$ and the other end of the power semiconductor switch $Q_{14}$. A connection point of the power semiconductor switch $Q_{11}$ and the power semiconductor switch $Q_{12}$ is connected to one end of a resonant circuit formed by a capacitor C' and an inductor L', and the other end of the resonant circuit is connected to one end of a primary coil of the transformer T', and the other end of the primary coil of the transformer T' is connected to the connection point of the power semiconductor switch $Q_{13}$ and the power semiconductor switch $Q_{14}$. The said one end of the DC bus capacitor $C_B'$ is the third end $X_3$ of the first power converter, and the other end of the DC bus capacitor $C_B'$ is the fourth end $X_4$ of the first power converter. The rectifier bridge includes four rectifier diodes, one end of the rectifier diode $D_1'$ is connected to one end of the rectifier diode $D_3'$, the other end of the rectifier diode $D_1'$ is connected to one end of the rectifier diode $D_2'$, the other end of the rectifier diode $D_3'$ is connected to one end of the rectifier diode $D_4'$, and the other end of the rectifier diode $D_2'$ is connected to the other end of the rectifier diode D4'. The said one end of the rectifier diode $D_1'$ is the fifth end $X_5$ of the converter, and the other end of the rectifier diode $D_2'$ is the sixth end $X_6$ of the converter. The output end of the transformer T' is respectively connected to the connection point of the rectifier diode $D_1'$ and the rectifier diode $D_2'$ and the connection point of the rectifier diode $D_3'$ and the rectifier diode $D_4'$. The transformer T' may be a center tap transformer having two secondary coils connected in parallel, or the transformer T' may have one single secondary coil.

In this embodiment, the third end $X_3$ of the first full-bridge resonant converter in each power unit 70 is connected to the first end $X_1$ of the power unit 70, the fourth end $X_4$ of first full-bridge resonant converter is connected to the third end $X_3$ of the second full-bridge resonant converter, and so on, the fourth end $X_4$ of the (M−1)-th full-bridge resonant converter is connected to the third end $X_3$ of the M-th full-bridge resonant converter, and the fourth end $X_4$ of the M-th full-bridge resonant converter is connected to the second end $X_2$ of the power unit 70. The fifth ends $X_5$ of all of the full-bridge resonant converters in each power unit 70 are connected together, and the sixth ends $X_6$ of all of the full-bridge resonant converters are connected together.

In this embodiment, the local controller 91 corresponding to each power unit can output 4*M local control signals, for controlling the turn-on and turn-off of the power semiconductor switches $Q_{11}$-$Q_{M4}$ in the full-bridge resonant converter 701. That is, each of the power semiconductor switches $Q_{11}$-$Q_{M4}$ needs a local control signal.

As shown in FIG. 13, each power unit 70 further includes M drive circuits 702. The drive circuits 702 are in one-to-one correspondence with the M full-bridge resonant converters 701. Each drive circuit 702 receives corresponding local control signals and outputs at least one driving signal to respectively control the turn-on and turn-off of the corresponding power semiconductor switches. Specifically, each drive circuit 702 receives the corresponding four local control signals, and outputs four driving signals to respectively control the turn-on and turn-off of the corresponding power semiconductor switches. Taking the drive circuit 702 corresponding to the first full-bridge resonant converter 701 as an example, the drive circuit outputs four driving signals for controlling the turn-on and turn-off of the power semiconductor switches $Q_{11}$-$Q_{14}$ respectively.

In other embodiments, each power unit 70 includes a plurality of drive circuits. The number of the drive circuits is equal to 4*M. Each drive circuit is connected to a corresponding one of the power semiconductor switches, and receives a corresponding local control signal to output a driving signal to control the turn-on and turn-off of the corresponding power semiconductor switch. Taking the four drive circuits corresponding to the first full-bridge resonant converter 701 as an example, the four drive circuits are respectively connected to the power semiconductor switches $Q_{11}$-$Q_{14}$ and each drive circuit outputs a driving signal to control the turn-on and turn-off of the corresponding one of the power semiconductor switches $Q_{11}$-$Q_{14}$.

Figure 14:
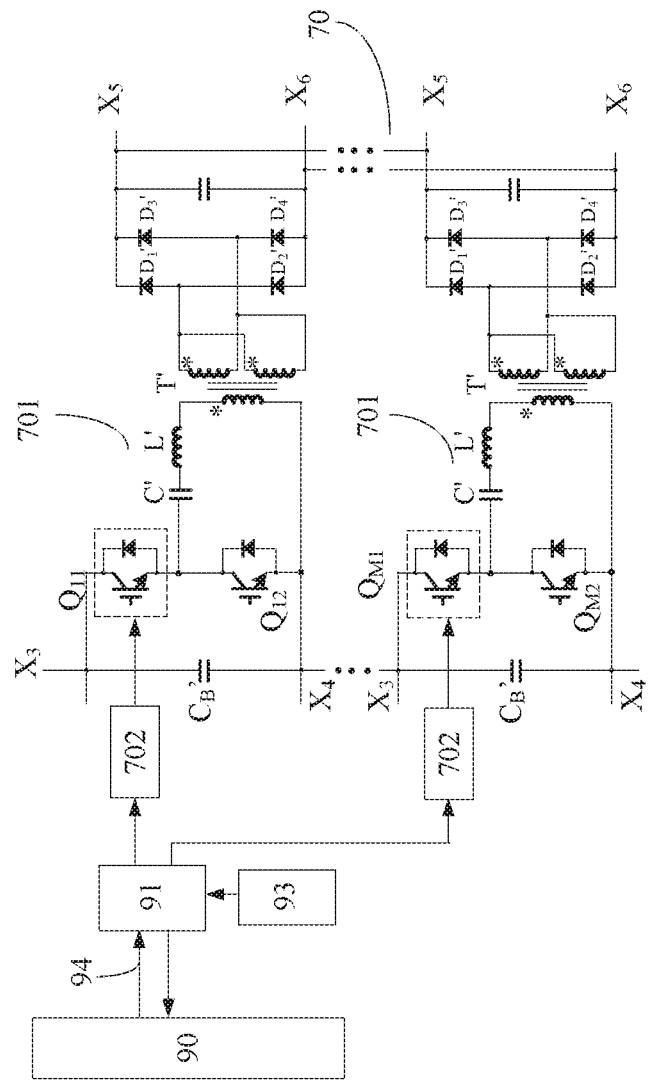
FIG. 14 is a block diagram of a modular power supply system in accordance with another embodiment of the present disclosure.

FIG. 14 is a block diagram of a modular power supply system in accordance with another embodiment of the present disclosure. As shown in FIG. 14, the topologies of all of the M power converters 701 of each power unit 70 in the modular power supply system of the present embodiment employ half-bridge resonant converters. Each of the half-bridge resonant converters 701 includes a half-bridge circuit, a resonant circuit, a transformer and a rectifier bridge, the connection relationship of which is as shown in FIG. 14. Taking the first half-bridge resonant converter 701 as an example, the half-bridge circuit includes two power semiconductor switches and one DC bus capacitor. One end of the power semiconductor switch $Q_{11}$ is connected to one end of the DC bus capacitor $C_B'$, the other end of the power semiconductor switch $Q_{11}$ is connected to one end of the power semiconductor switch $Q_{12}$, and the other end of the power semiconductor switch $Q_{12}$ is connected to the other end of the DC bus capacitor $C_B'$. A connection point of the power semiconductor switch $Q_{11}$ and the power semiconductor switch $Q_{12}$ is connected to one end of a resonant circuit formed by a capacitor C' and an inductor L', the other end of the resonant circuit is connected to one end of a primary coil of the transformer T', and the other end of the primary coil of the transformer T' is connected to the said the other end of the power semiconductor switch $Q_{12}$. The said one end of the DC bus capacitor $C_B'$ is the third end $X_3$ of the first power converter, and the said the other end of the DC bus capacitor $C_8'$ is the fourth end $X_4$ of the first power converter. The rectifier bridge includes four rectifier diodes, one end of the rectifier diode $D_1'$ is connected to one end of the rectifier diode $D_3'$, the other end of the rectifier diode $D_1'$ is connected to one end of the rectifier diode $D_2'$, the other end of the rectifier diode $D_3'$ is connected to one end of the rectifier diode $D_4'$, and the other end of the rectifier diode $D_2'$ is connected to the other end of the rectifier diode D4'. The said one end of the rectifier diode $D_1'$ is the fifth end $X_5$ of the converter, and the said the other end of the rectifier diode $D_2'$ is the sixth end $X_6$ of the converter. The output end of the transformer T' is respectively connected to the connection point of the rectifier diode $D_1'$ and the rectifier diode $D_2'$ and the connection point of the rectifier diode $D_3'$ and the rectifier diode $D_4'$. The transformer r may be a center tap transformer having two secondary coils connected in parallel, or the transformer T' may have one single secondary coil as well.

In this embodiment, the third end $X_3$ of the first half-bridge resonant converter in each power unit 70 is connected to the first end $X_1$ of the power unit 70, the fourth end $X_4$ of first half-bridge resonant converter is connected to the third end $X_3$ of the second half-bridge resonant converter, and so on, the fourth end $X_4$ of the (M−1)-th half bridge resonant converter is connected to the third end $X_3$ of the M-th half-bridge resonant converter, and the fourth end $X_4$ of the M-th half-bridge resonant converter is connected to the second end $X_2$ of the power unit 70. The fifth ends $X_5$ of all of the full-bridge resonant converters in each power unit 70 are connected together, and the sixth ends $X_6$ of all of the full-bridge resonant converters are connected together.

In this embodiment, the local controller 91 corresponding to each power unit can output 2*M local control signals, for controlling the turn-on and turn-off of the power semiconductor switches $Q_{11}$-$Q_{M2}$ in the half-bridge resonant converter 701. That is, each of the power semiconductor switches $Q_{11}$-$Q_{M2}$ needs a local control signal.

As shown in FIG. 14, each power unit 70 further includes M drive circuits 702. The drive circuits 702 are in one-to-one correspondence with the M half-bridge resonant converters 701. Each drive circuit 702 receives corresponding local control signals and outputs at least one driving signal to respectively control the turn-on and turn-off of the corresponding power semiconductor switches. Specifically, each drive circuit 702 receives the corresponding two local control signals, and outputs two driving signals to respectively control the turn-on and turn-off of the corresponding power semiconductor switches. Taking the drive circuit 702 corresponding to the first half-bridge resonant converter 701 as an example, the drive circuit outputs two driving signals for controlling the turn-on and turn-off of the power semiconductor switches $Q_{11}$-$Q_{12}$ respectively.

In other embodiments, each power unit 70 includes a plurality of drive circuits. The number of the drive circuits is equal to 2*M. Each drive circuit is connected to a corresponding one of the power semiconductor switches, and receives a corresponding local control signal and outputs a driving signal to control the turn-on and turn-off of the corresponding power semiconductor switch. Taking the two drive circuits corresponding to the first half-bridge resonant converter 701 as an example, the two drive circuits are respectively connected to the power semiconductor switches $Q_{11}$-$Q_{12}$ and each drive circuit outputs a driving signal to control the turn-on and turn-off of the corresponding one of the power semiconductor switches $Q_{11}$-$Q_{12}$.

The M power converters 701 in the modular power supply system of FIG. 13 and FIG. 14 may be DC/DC converters, but not limited thereto, and may be converters of other topologies as well.

Figure 15:
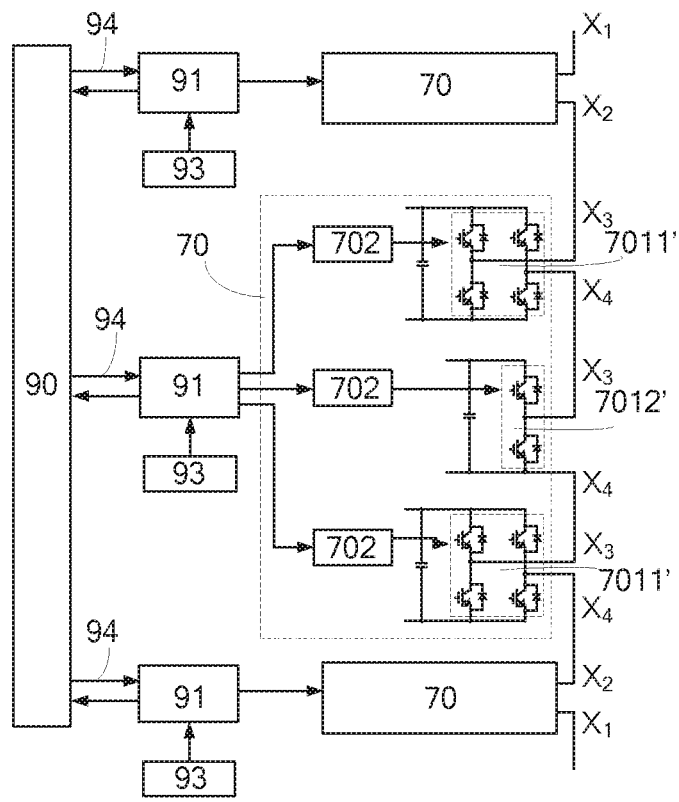
FIG. 15 is a block diagram of a modular power supply system in accordance with another embodiment of the present disclosure.

FIG. 15 is a block diagram of a modular power supply system in accordance with another embodiment of the present disclosure. As shown in FIG. 15, the topologies of the M power converters 701 of each power unit 70 in the modular power supply system of the present embodiment employ a combination of a full-bridge converter and a half-bridge converter. Each power converter 7011' of full-bridge converter includes four power semiconductor switches, and each half-bridge converter 7012' includes two power semiconductor switches, the connection relationship of which is as shown in FIG. 15. In this embodiment, the specific connection relationship of the full-bridge converter is as shown in FIG. 8, and the specific connection relationship of the half-bridge converter is shown in FIG. 9, so details are not described herein again. Similarly, the fourth end $X_4$ of one of the adjacent two power converters 701 is connected to the third end $X_3$ of the other one of the adjacent two power converters 701, where M is a natural number greater than one. Thus, the third end $X_3$ of the first power converter 701 is connected to the first end $X_1$ of the power unit 70, the fourth end $X_4$ of the first power converter 701 is connected to the third end $X_3$ of the second power converter 701, and so on, the fourth end $X_4$ of the (M−1)-th power converter 701 is connected to the third end $X_3$ of the M-th power converter 701, and the fourth end $X_4$ of the M-th power converter 701 is connected to the second end $X_2$ of the power unit 70.

In this embodiment, the number of local control signals output by the local controller 91 corresponding to each power unit 70 is equal to the number of power semiconductor switches in the power unit 70. These local control signals respectively control turn-on and turn-off of the power semiconductor switches in the full-bridge converter and the half-bridge converter 701 (i.e., power converter 7011' and 7012'). That is, each power semiconductor switch needs a local control signal.

As shown in FIG. 15, each power unit 70 further includes M drive circuits 702. The drive circuits 702 are in one-to-one correspondence with the M power converters 7011' and 7012'. Each drive circuit 702 receives corresponding local control signals and outputs at least one driving signal to respectively control the turn-on and turn-off of the corresponding power semiconductor switches. Specifically, the drive circuit 702 corresponding to the power converters 7011' receives the corresponding four local control signals, and outputs four driving signals to respectively control the turn-on and turn-off of the corresponding power semiconductor switches. The drive circuit 702 corresponding to the power converters 7012' receives the corresponding two local control signals, and outputs two driving signals to respectively control the turn-on and turn-off of the corresponding power semiconductor switches.

In other embodiments, each power unit 70 includes a plurality of drive circuits. The number of drive circuits in the power unit is equal to the number of power semiconductor switches in the corresponding power unit. Each drive circuit is connected to a corresponding one of the power semiconductor switches, and receives a corresponding local control signal to output a driving signal to control the turn-on and turn-off of the corresponding power semiconductor switch. Taking the four drive circuits corresponding to the power converter 7011' as an example, the four drive circuits are respectively connected to the corresponding power semiconductor switches and each of the drive circuits outputs a driving signal to control the turn-on and turn-off of the corresponding one of the power semiconductor switches. Taking the two drive circuits corresponding to the power converter 7012' as an example, the two drive circuits are respectively connected to the corresponding power semiconductor switches and each of the drive circuits outputs a driving signal to control the turn-on and turn-off of the corresponding one of the power semiconductor switches.

Although FIG. 15 only shows that the topologies of the M power converters 701 of each power unit 70 in the modular power supply system of the present embodiment employ a combination of full-bridge converters and half-bridge converters, but the present disclosure is not limited thereto. As described above, the topologies of the M power converters 701 of each power unit 70 in the modular power supply system of the present embodiment may be a combination of two or more kinds of full-bridge converters, half-bridge converters, neutral point clamped three-level converters, diode clamping three-level converters, flying capacitor three-level converters, full-bridge LLC resonant converters and half-bridge LLC resonant converters.

Each of the M power converters 701 in each of the power units 70 of the modular power supply system of the present disclosure may be configured to include: at least one power semiconductor switch, such as the aforementioned power semiconductor switches $Q_{11}$-$Q_{14}$, $Q_{11}$-$Q_{12}$, $Q_{11}$-$Q_{18}$, $Q_{M1}$-$Q_{M4}$, $Q_{M1}$-$Q_{M2}$ or $Q_{M1}$-$Q_{M8}$, wherein each of the aforementioned local control signals is configured to control the turn-on and turn-off of the corresponding power semiconductor switch.

Each of the drive circuits 702 of the modular power supply system of the present disclosure may be directly electrically connected to the corresponding local controller 91, or connected to the corresponding local controller 91 by a magnetic isolation device or an optical isolation device.

Figure 16:
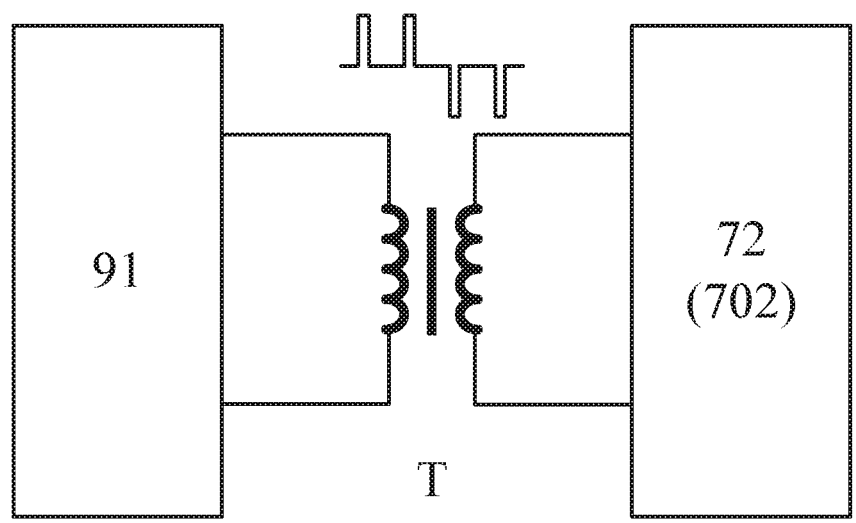
FIG. 16 is a schematic view showing the connection between the local controller and the drive circuit of the present disclosure.

FIG. 16 is a schematic view showing the connection between the local controller and the drive circuit of the present disclosure. As shown in FIG. 16, as an embodiment, the drive circuit 72 (i.e., 702) is connected to the corresponding local controller 91 via a magnetic isolation device T, to transmit local control signals. The use of the magnetic isolation device has advantages of high reliability, high performance and low power consumption.

As an embodiment, the driver circuit 72 (702) and the corresponding local controller 91 may also be connected by an optical isolation device. The use of optical isolation device has advantages of one-way signal transmission, complete electrical isolation between the input end and the output end, no influence of the output signal to the input end, strong anti-interference ability, stable operation, no contact, long service life span and high transmission efficiency.

As an embodiment, drive circuit 72 (702) is directly electrically connected to the corresponding local controller 91.

Each of the drive circuits 72 (702) in the modular power supply system of the present disclosure may be identical to each other or different from each other.

As shown in FIGS. 6 to 15, each of the drive circuits 702 in the modular power supply system of the present embodiment is identical to each other.

Figure 17:
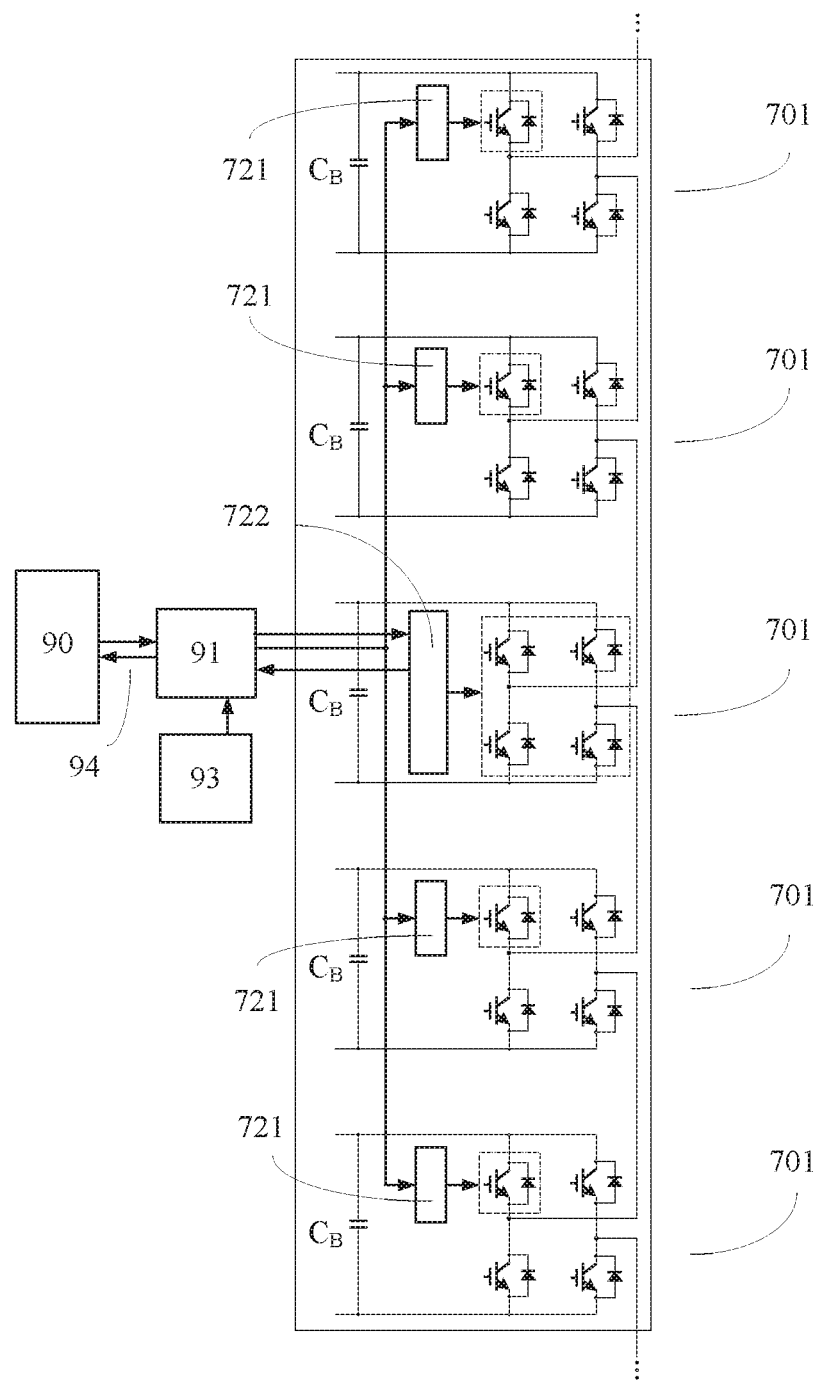
FIG. 17 is a block diagram of a modular power supply system in accordance with another embodiment of the present disclosure.

FIG. 17 is a block diagram of a modular power supply system in accordance with another embodiment of the present disclosure. As shown in FIG. 17, a power unit 701 of the modular power supply system of the present embodiment includes five power converters 701 of H-bridge circuits. The drive circuits 721 of the four power converters 701 are different from the drive circuit 722 of the power converter 701 in the center position.

Figure 18:
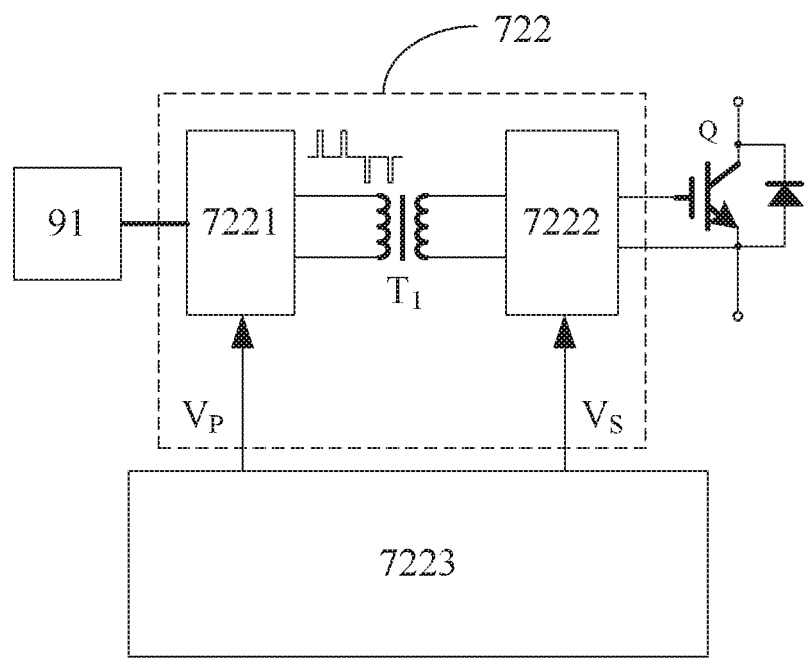
FIG. 18 is a schematic view showing the drive mode of the drive circuit of the present disclosure.

FIG. 18 is a schematic view showing the drive mode of the drive circuit of the present disclosure. As shown in FIG. 18, the drive circuit 722 includes a primary circuit 7221, a secondary circuit 7222 and a magnetic isolation device $T_1$. The primary circuit 7221 receives a local control signal output by the local controller 91, wherein the local control signal only contains a driving component. The local control signal is a low-power signal. The primary circuit 7221 modulates the local control signal into a narrow pulse signal with high and low levels, wherein the narrow pulse signal with high and low levels includes drive logic pulses, and the narrow pulse signal is transmitted to the secondary circuit 7222 via a magnetic isolation device (for example, a high frequency isolation transformer) $T_1$. The secondary circuit 7222 restores the narrow pulse signals of high and low levels to PWM (Pulse Width Modulation) signals and performs amplification processing on it to output driving signals for controlling the turn-on and turn-off of the power semiconductor switches Q. The power unit 70 further includes a power supply circuit 7223 for supplying power source for the primary circuit 7221 and the secondary circuit 7222. The power received by the power supply circuit 7223 may be from the auxiliary source 93 or other external power sources. The power supply circuit 7223 converts the received power into a voltage $V_P$ for supplying the primary circuit 7221 and a voltage $V_S$ for supplying the secondary circuit 7222, and the voltage $V_P$ and $V_S$ are isolated from each other. In other embodiments, the power supply circuit 7223 includes a primary power supply circuit (not shown), an isolation transformer (not shown) and a secondary power supply circuit (not shown). The primary power supply circuit converts the received power into the primary power supply to supply the primary circuit 7221 with the direct current $V_P$, and the primary power supply circuit converts the received power into power pulses (that is, power supply pulses) and transmit them to the secondary power supply circuit by the isolation transformer, and then the secondary power supply circuit converts the power pulse into the secondary power supply to supply the secondary circuit 7222 with the direct current $V_S$.

In order to simplify the drive circuit 722, save cost, and improve reliability of the drive circuit 72, the drive mode of each power converter in the present disclosure can adopt "simple drive".

Figure 19:
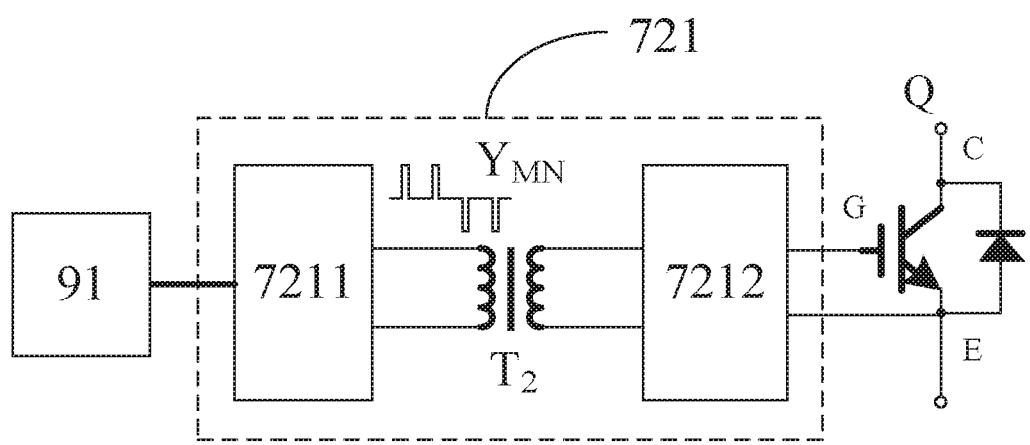
FIG. 19 is a schematic view showing another drive mode of the drive circuit of the present disclosure.

FIG. 19 is a schematic view showing another drive mode of the drive circuit of the present disclosure. As shown in FIG. 19, each of the drive circuits 721 of the modular power supply system of the present embodiment includes a primary circuit 7211, a secondary circuit 7212 and a magnetic isolation device (for example, an isolation transformer) $T_2$. The primary circuit 7211 receives a local control signal, wherein the local control signal includes a driving component and a power component. The local control signal is a high-power signal. The primary circuit 7211 modulates the local control signal into a positive-negative narrow pulse signal $Y_{MN}$ and transmitted it to the secondary circuit 7212 via the magnetic isolation device $T_2$. The secondary circuit 7212 demodulates the narrow pulse signal $Y_{MN}$ into a driving signal for controlling the power semiconductor switch Q to be turned on and off. The positive-negative narrow pulse signal $Y_{MN}$ includes drive logic pulses and power pulses. The power semiconductor switch Q includes, for example, a gate G, a collector C and an emitter E. The driving signal is output to the gate G of the power semiconductor switch. The driving mode described in FIG. 19 is the said "simple drive". This "simple drive" eliminates a large number of power supply circuits, so that the number of devices of the drive circuit 721 is reduced much, the structure of the entire drive circuit 721 is simplified, the power consumption is reduced, and the reliability is improved.

Figure 20:
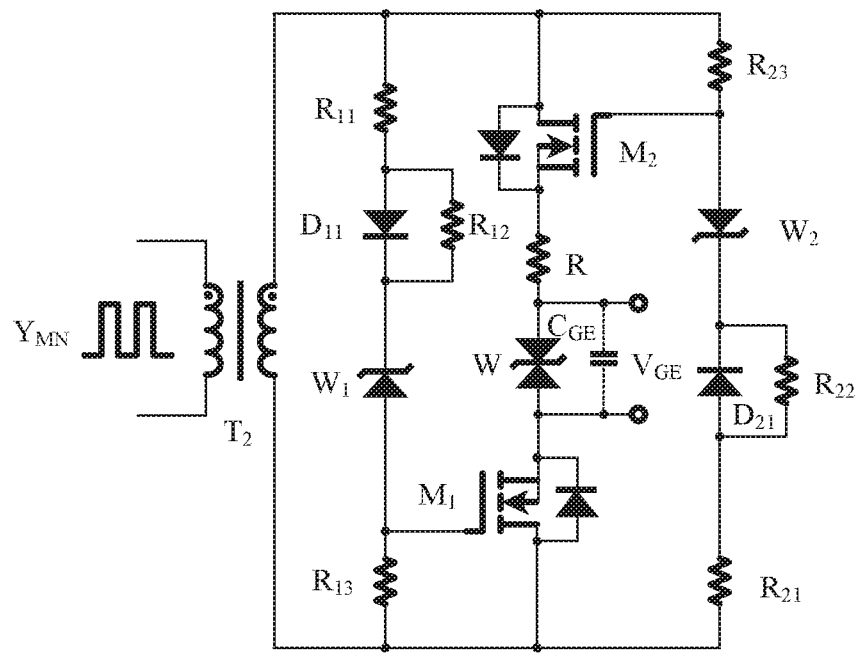
FIG. 20 is a circuit diagram of a drive circuit of one embodiment of the present disclosure.
Figure 21:
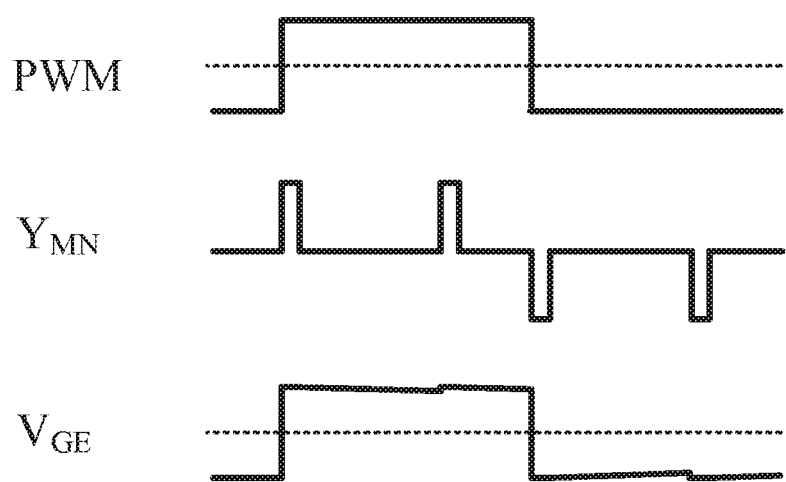
FIG. 21 is a sequence chart of a drive circuit of one embodiment of the present disclosure.

FIG. 20 is a circuit diagram of a drive circuit of one embodiment of the present disclosure. FIG. 20 is based on FIG. 19 and is an embodiment of the secondary circuit of the drive circuit of FIG. 19. FIG. 21 is a sequence chart of a drive circuit of one embodiment of the present disclosure. As shown in FIG. 20, the drive circuit of the present disclosure mainly includes a magnetic isolation device $T_2$ and a bidirectional Zener diode W, and other elements such as resistors $R_{11}$, $R_{12}$, $R_{13}$, R, $R_{21}$, $R_{22}$ and $R_{23}$, a gate capacitor $C_{GE}$, diodes $D_{11}$ and $D_{21}$, stabilivolts $W_1$ and $W_2$ and switches $M_1$ and $M_2$ are auxiliary elements, and the connection relationship thereof is as shown in FIG. 20.

In combination with FIG. 20 and FIG. 21, a local control signal PWM sent by the local controller 91 is modulated by the primary circuit to form a positive-negative pulse signal $Y_{MN}$, as shown by $Y_{MN}$ in FIG. 21. The positive-negative pulse signal $Y_{MN}$ is transmitted to the secondary circuit by a magnetic isolation device (for example, an isolation transformer) $T_2$, to trigger the switching transistor $M_1$ and $M_2$ to charge or discharge a gate capacitor $C_{GE}$ of the IGBT so as to form a driving signal $V_{GE}$ needed for controlling the power semiconductor switch. A waveform of the $V_{GE}$ is basically similar to the local control signal PWM, as shown in FIG. 21. In order to reduce the size of the magnetic core of the magnetic isolation device (that is, the isolation transformer $T_2$) and to keep the magnetic core being unsaturated, a width of a refresh pulse of the positive-negative pulse signal $Y_{MN}$ may be only a several microsecond (μs). For example, the gate-emitter voltage $V_{GE}$ of the power semiconductor switch Q is positive, when a positive pulse of several μs charges the gate capacitor $C_{GE}$ once, the driving signal $V_{GE}$ may reach a gate turn-on voltage of the power semiconductor switch, such as +15V. However, in order to maintain the power semiconductor turned on, the needed positive pulse may be tens of us to hundreds of μs or even longer. Therefore, without refresh pulse, the gate capacitor $C_{GE}$ will slowly discharge, causing the driving signal $V_{GE}$ to gradually decrease, such that it cannot reach the gate-turn-on voltage that the power semiconductor switch needs to be normally turned on. Therefore, the refresh pulse is needed to charge the gate capacitor $C_{GE}$ at intervals to maintain the driving signal $V_{GE}$ being at the normal gate-turn-on voltage. The time interval of providing the refresh pulse is mainly determined by the discharge time constant of the gate capacitor $C_{GE}$. The principle is that the $V_{GE}$ does not drop too much before the next refresh pulse arrives. For example, the driving signal $V_{GE}$ shall not be lower than 14V before the next refresh pulse arrives.

The local control signal received by the drive circuit of FIG. 20 contains drive logic pulses and power pulses, so the drive circuit does not need an external power supply, and the local control signal does not need to be amplified either. Compared with the drive circuit of FIG. 18, a lot of power supply circuits are omitted, which reduces the number of devices of the drive circuit 721, simplifies the structure of the entire drive circuit 721, reduces the power consumption, and improves the reliability.

In the above embodiment of the present disclosure, as shown in FIG. 6 to FIG. 15, each of the drive circuits 702 may adopt the drive circuit described in FIG. 19, wherein the local control signal transmitted by the magnetic isolation device $T_2$ includes the drive logic pulses and the power pulses.

In the above embodiment of the present disclosure, as shown in FIGS. 6-15, each of the drive circuits 702 may employ the drive circuit described in FIG. 18, wherein the magnetic isolation device $T_1$ transmits the drive logic pulses included in the local control signal.

In the above embodiment of the present disclosure, as shown in FIGS. 6-15, a portion of the drive circuit 702 may employ the drive circuit described in FIG. 19, wherein the magnetic isolation device transmits the drive logic pulses and the power pulses contained in the local control signal; and another portion of the driver circuit 702 employs the driver circuit described in FIG. 18, wherein the magnetic isolation device transmits the drive logic pulses contained in the local control signals.

In the above embodiment of the present disclosure, as shown in FIG. 17, the drive circuit 721 may adopt the drive circuit described in FIG. 19, wherein the magnetic isolation device transmits the drive logic pulses and the power pulses contained in the local control signal; and the drive circuit 722 adopts the drive circuit described in FIG. 18, wherein the magnetic isolation device transmits the drive logic pulses contained in the local control signal.

In the above embodiment of the present disclosure, as shown in FIG. 17, the drive circuit 722 may adopt the drive circuit described in FIG. 19, wherein the magnetic isolation device transmits the drive logic pulses and the power pulses contained in the local control signal; and the drive circuit 721 adopts the drive circuit described in FIG. 18, wherein the magnetic isolation device transmits the drive logic pulses contained in the local control signal.

Figure 22:
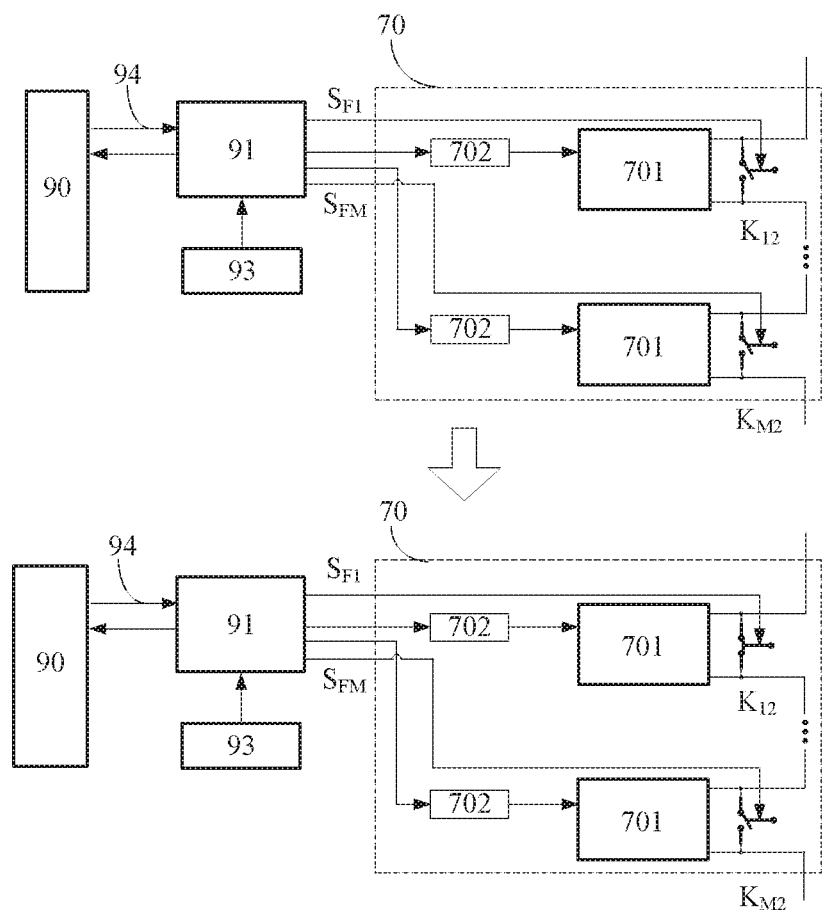
FIG. 22 is a block diagram of a modular power supply system in accordance with another embodiment of the present disclosure.

FIG. 22 is a block diagram of a modular power supply system in accordance with another embodiment of the present disclosure. As shown in FIG. 22, a bypass switch $K_{12}$ is connected in parallel between the third end $X_3$ and the fourth end $X_4$ of each of the power converters 701 in the modular power supply system of the present embodiment. For example, the bypass switch $K_{12}$ is a normally-off switch. The bypass switch $K_{12}$ is turned off when the power converter operates normally, and the bypass switch $K_{12}$ is turned on when the power converter 401 fails.

As an embodiment, the bypass switch $K_{12}$ is a half-controlled device, such as a thyristor, or a fully-controlled device such as an IGBT, or a mechanical switch.

As shown in FIG. 22, when any of the power converters 701 fails, a fault detecting circuit (not shown in FIG. 22) detects various types of faults of the power converter 701, and outputs a corresponding fault signal to the local controller 91 according to the fault type. The local controller 91 receives a fault signal reflecting the fault type of the corresponding power converter 701, and outputs a corresponding protection signal to control the switch $K_{12}$ of the corresponding power converter 701 to be turned on, and the local controller 91 stops outputting the local control signal that controls the operation of the corresponding power converter 701.

As shown in FIG. 22, the bypass switch $K_{12}$ in each power converter 701 is controlled in accordance with a fault signal fed back by the power converter 701 itself. During the operation of the power unit 70, after the local controller 91 receives a fault signal fed back by any of the power converters 701, the local controller 91 controls the bypass switch $K_{12}$ in the corresponding power converter to be turned on according to the fault signal, and stops outputting the local control signal of controlling the operation of the faulty power converter 701. That is, the faulty power converter 701 is bypassed. Taking the case that one power converter fails as an example, if the first power converter 701 fails, the local controller 91 will receives a fault signal reflecting the fault type of the first power converter, and output a protection signal $S_H$ to control the bypass switch $K_{12}$ of the first power converter 701 to be turned on, and the local controller 91 stops outputting the local control signal of controlling the operation of the first power converter 701. Taking the case that two power converters fail as an example, if both the first power converter 701 and the M-th power converter fail, the local controller 91 will receive the fault signals reflecting the fault types of both the first power converter and the M-th power converter, and output the protection signals $S_{F1}$ and $S_{FM}$ to respectively control the bypass switches $K_{12}$ of both the first power converter 701 and the M-th power converter 701 to be turned on, and the local controller 91 stops outputting the local control signals of controlling the operation of both the first power converter 701 and the M-th power converter 701.

Figure 23:
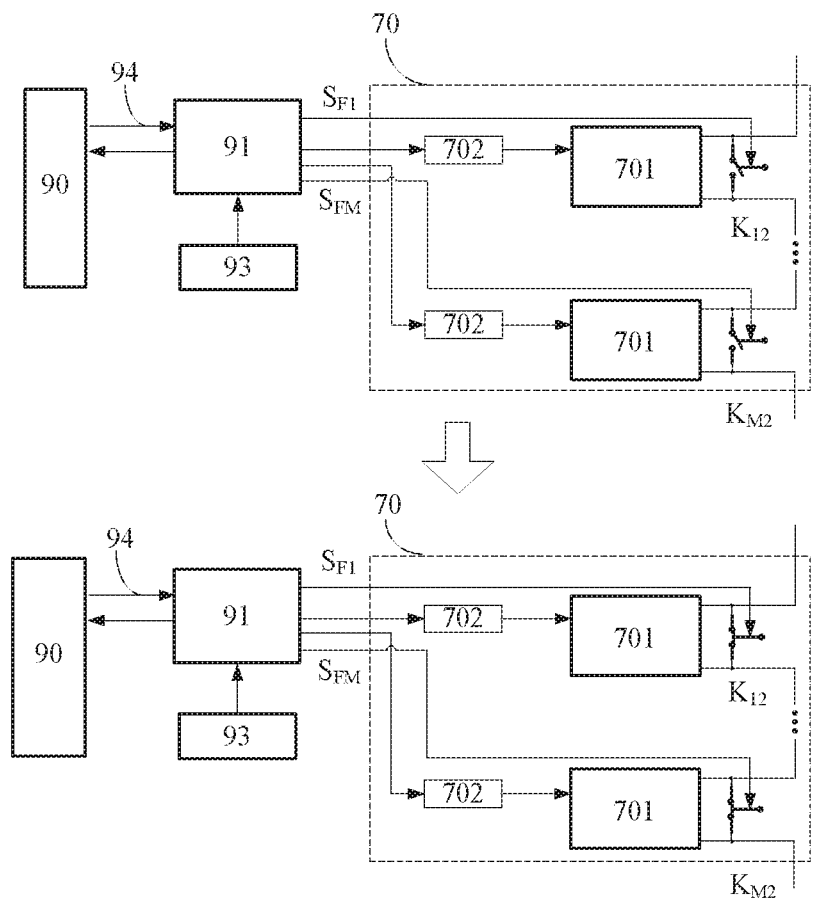
FIG. 23 is a block diagram of a modular power supply system in accordance with another embodiment of the present disclosure.

FIG. 23 is a block diagram of a modular power supply system in accordance with another embodiment of the present disclosure. As shown in FIG. 23, the number of protection signals in the modular power supply system of the present embodiment is M, which corresponds to the foregoing M power converters 701 one to one. The local control signals of the modular power supply system of this embodiment respectively control the bypass switches $K_{12}$ of the corresponding power converter 701 to be turned on according to each protection signal $S_{F1}$ to $S_{FM}$, and the local controller 91 stops outputting the local control signals of controlling the operation of all of the power converters 701 in the power unit 70.

As shown in FIG. 23, during the operation of the power unit 70, after the local controller 91 receives a fault signal fed back by any of the power converters 701, the local controller 91 outputs the protection signals $S_{F1}$, $S_{FM}$ according to the fault signal, to control the switches K12 in all power converters 701 to be turned on and at the same time stops outputting the local control signal, i.e., the whole power unit 70 is bypassed.

Figure 24:
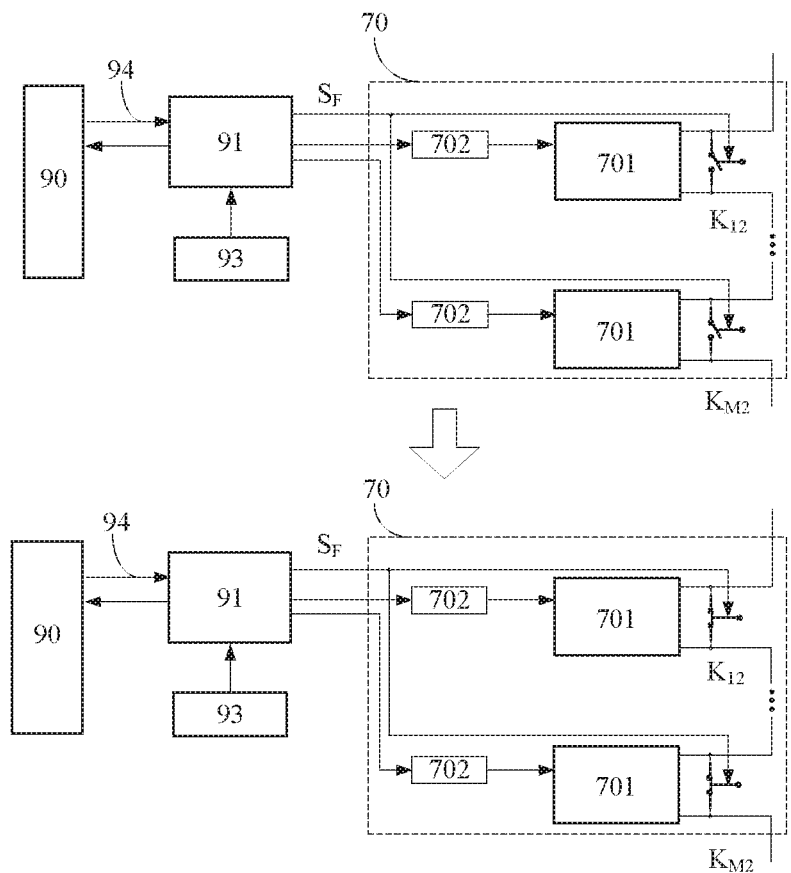
FIG. 24 is a block diagram of a modular power supply system in accordance with another embodiment of the present disclosure.

FIG. 24 is a block diagram of a modular power supply system in accordance with another embodiment of the present disclosure. As shown in FIG. 24, the number of protection signals $S_F$ in the modular power supply system of the present embodiment is 1. The local controller 91 outputs a protection signal $S_F$ to control the bypass switches $K_{12}$ of all of the M power converters to be turned on, and the local controller 91 stops outputting local control signals of controlling the operation of all of the power converters 701 in the power unit 70.

As shown in FIG. 24, the bypass switches $K_{12}$ of all the power converters in the power unit 70 are controlled by the protection signal $S_F$ output from the local controller 91. During operation of the power unit 70, after the local controller 91 receives a fault signal fed back by any of the power converters 701, the local controller 91 outputs a protection signal $S_F$ according to the fault signal to control the bypass switches $K_{12}$ in all of the power converters 701 to be turned on, and at the same time stops outputting the local control signal, i.e., the whole power unit 70 is bypassed.

Figure 25:
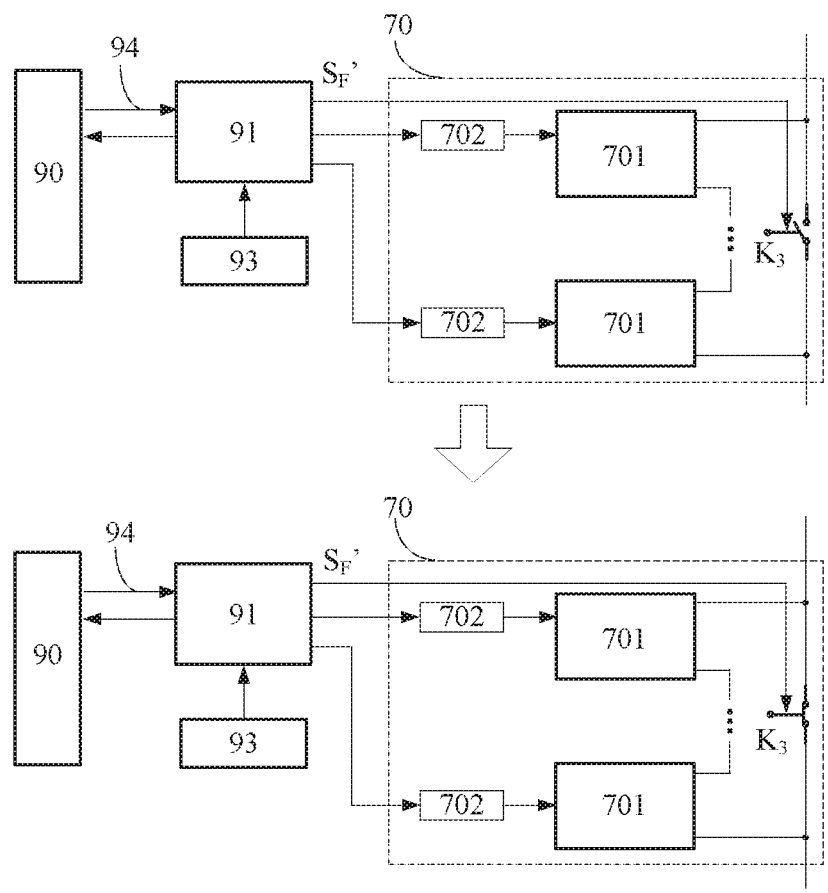
FIG. 25 is a block diagram of a modular power supply system in accordance with another embodiment of the present disclosure.

FIG. 25 is a block diagram of a modular power supply system in accordance with another embodiment of the present disclosure. As shown in FIG. 25, a third bypass switch $K_3$ is connected in parallel between the first end $X_1$ and the second end $X_2$ of the power unit 70 in the modular power supply system of the embodiment. When the power unit 70 operates normally, the third bypass switch $K_3$ is turned off, and when the power unit 70 fails, the third bypass switch $K_3$ is turned on.

As shown in FIG. 25, when any of the power converters 701 fails, the local controller 91 will receive a fault signal reflecting the fault type of the corresponding power converter 701, and output a protection signal $S_F'$ to control the bypass switch $K_3$ to be turned on, and the local controller 91 stops outputting the local control signal that controls the operation of all of the power converters 701 in the power unit 70.

As shown in FIG. 25, a normally open switch $K_3$ is connected in parallel at the output end of the power unit 70, and the bypass switch $K_3$ is controlled by the local controller 91. During the operation of the power unit 70, after the local controller 91 receives a fault signal fed back by any of the power converters 701, the local controller 91 outputs a protection signal $S_F'$ according to the fault signal to control the bypass switch $K_3$ to be turned on, and at the same time stop outputting all of the local control signals within the power unit 70, i.e., the whole power unit 70 is bypassed.

Figure 26:
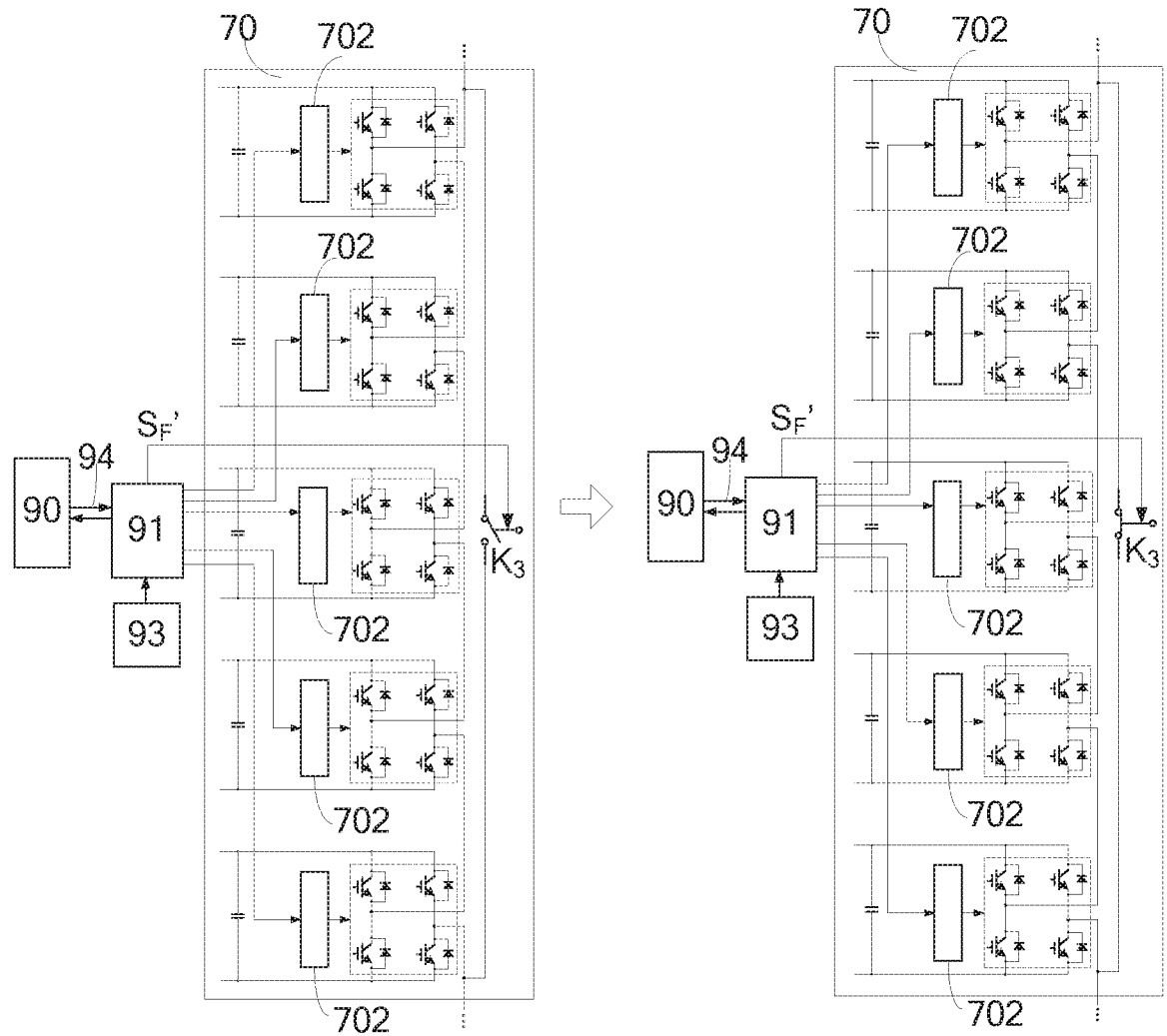
FIG. 26 is a block diagram of a modular power supply system in accordance with another embodiment of the present disclosure.

FIG. 26 is a block diagram of a modular power supply system in accordance with another embodiment of the present disclosure. As shown in FIG. 26, the power unit 70 in the modular power supply system of the present embodiment is composed of five cascaded power converters of H-bridge circuits. A normally-open bypass switch $K_3$ is connected in parallel at the output end of the power unit 70, and the switch $K_3$ is controlled by the local controller 91. During the operation of the power unit 70, after any power converter of the H-bridge circuits fails and feeds back a fault signal to the local controller 91, the local controller 91 will output a protection signal $S_F'$ according to the fault signal to control the bypass switch $K_3$ to be turned on, and at the same time stops outputting all of the local control signals that controls the operation of the power unit 70, i.e., the whole power unit 70 is bypassed.

In the present disclosure, by constituting a plurality of power converters as one power unit and adopting a set of local controller and optical fiber to control the plurality of power converters, the number of local controllers and optical fibers may be reduced much, the structural design may be simplified, the cost may be reduced, and the reliability may be improved.

The present disclosure is applicable to all topologies connected by AC/DC, DC/AC, DC/DC power converters, and may be widely used.

The exemplary embodiments of the present disclosure have been particularly shown and described above. It is to be understood that the disclosure is not limited to the details of the specific structures, arrangements, or implementations described herein; rather, the disclosure is intended to cover various modifications and equivalents within the spirit and scope of the claims. It should be further noted that the above embodiments are merely illustrative of the technical solutions of the present disclosure, and are not intended to be limiting; although the present disclosure has been described in detail with reference to the foregoing embodiments, those skilled in the art will understand that the technical solutions described in the foregoing embodiments may be modified, or some or all of the technical features may be equivalently replaced; and the modifications or substitutions do not depart from the scope of the technical solutions of the embodiments of the present disclosure.

What is claimed is:

1. A modular power supply system, configured to comprise:
    a main controller, configured to output a main control signal;
    N local controllers, wherein each of the local controllers is configured to receive the main control signal to output at least one local control signal; and
    N power units, in one-to-one correspondence with the N local controllers, wherein each one of the power units comprises a first end and a second end, and the second end of the said one power units is connected to the first end of an adjacent one of the power units, the said one power unit is further configured to comprise M power converters, wherein each one of the power converters comprises a third end and a fourth end, the fourth end of the said one power converter is connected to the third end of an adjacent one of the power converters, and the third end of a first one of the power converters is connected to the first end of the said one power unit, the fourth end of an M-th one of the power converters is connected to the second end of the said one power unit, each of the power converters is configured to operate according to the local control signal output by a corresponding local controller, and the first end of a first one of the power units is open and the second end of a N-th one of the power units is open, wherein both N and M are natural numbers greater than one, wherein the said one power unit further comprises: M drive circuits, in one-to-one correspondence with the M power converters, wherein each one of the drive circuits is configured to be connected to at least one power semiconductor switch of the corresponding power converter, and receive the at least one local control signal output by the corresponding local controller, to output at lease one driving signal to control turn-on and turn-off of the power semiconductor switch in the corresponding M power converters; or the said one power unit further comprises: a plurality of drive circuits, wherein a number of the plurality of drive circuits is equal to a number of the power semiconductor switches in the power unit, each one of the drive circuits is configured to be connected to the power semiconductor switch of the corresponding power converter, to receive a local control signal output by the corresponding local controller to output a driving signal to control turn-on and turn-off of the corresponding power semiconductor switch, and wherein each of the drive circuits comprises a magnetic isolation device, the magnetic isolation device of a portion of the drive circuits transmits drive logic pulses contained in the local control signal, and the magnetic isolation device of another portion of the drive circuits transmits the drive logic pulses and power pulses contained in the local control signal.

2. The modular power supply system of claim 1, further comprising:

N auxiliary power supplies, in one-to-one correspondence with the N local controllers, wherein each of the auxiliary power supplies is configured to provide power to a corresponding local controller.

3. The modular power supply system of claim 1, wherein the power converter is any one of an AC/DC converter, a DC/AC converter and a DC/DC converter.

4. The modular power supply system of claim 1, wherein the topology of all of the M power converters in each of the power units is full-bridge converters.

5. The modular power supply system of claim 1, wherein the topologies of the M power converters in each of the power units ae a combination of two or mom kinds of full-bridge converters, half-bridge converters, neutral point clamped three-level converters, diode clamping three-level converters, flying capacitor three-level converters, full-bridge resonant converters and half-bridge resonant converters.

6. The modular power supply system of claim 5, wherein each of the power converters is configured to comprise: at least one power semiconductor switch, wherein each of the local control signals is configured to control turn-on and turn-off of a corresponding power semiconductor switch.

7. The modular power supply system of claim 1, wherein each of the local controllers is connected to the main controller by a magnetic isolation device or an optical isolation device.

8. The modular power supply system of claim 1, wherein a number of the at least one local control signal is identical to a number of the at least one power semiconductor switch in the power converter, and each of the local control signals is configured to control the corresponding power semiconductor switch to be turned on or off.

9. The modular power supply system of claim 1, wherein a bypass switch is connected in parallel between the third end and the fourth end of each of the power converters, the bypass switch is turned off when the power converter operates normally, and the bypass switch is turned on when the power converter fails.

10. The modular power supply system of claim 9, wherein, when any one of the power converter fails, the local controller receives a fault signal reflecting a fault type of the corresponding power converter, and outputs at least one protection signal.

11. The modular power supply system of claim 10, wherein the local controller outputs the protection signal to control the bypass switch of the corresponding power converter to be turned on, and the local controller stops outputting the local control signal that controls operation of the corresponding power converter.

12. The modular power supply system of claim 10, wherein a number of the at least one protection signal is M, the local controller outputs each of the protection signals to control the bypass switches of the corresponding power converters to be turned on, and the local controller stops outputting the at least one local control signal that controls operation of the M power converters.

13. The modular power supply system of claim 10, wherein a number of the at least one protection signal is one, the local controller outputs the protection signal to control the bypass switches of the M power converters to be turned on, and the local controller stops outputting the at least one local control signal that controls operation of the M power converters.

14. The modular power supply system of claim 1, wherein a bypass switch is connected in parallel between the first end and the second end of the power unit, the bypass switch is turned off when the power unit operates normally, and the bypass switch is turned on when the power unit fails.

15. The modular power supply system of claim 14, wherein, when any one of the power converters fails, the local controller receives a fault signal reflecting a failure type of the corresponding power converter, and outputs a protection signal to control the bypass switch to be turned on, and the local controller stops outputting the at least one local control signal that controls operation of the M power converters.

* * * * *